United States Patent
Mao

(10) Patent No.: US 10,637,295 B2
(45) Date of Patent: Apr. 28, 2020

(54) WIRELESS POWER TRANSFER SYSTEM AND METHOD

(71) Applicant: NuVolta Technologies, Milpitas, CA (US)

(72) Inventor: Hengchun Mao, Allen, TX (US)

(73) Assignee: NuVolta Technologies, Milpitas, CA (US)

( * ) Notice: Subject to any disclaimer, the term of this patent is extended or adjusted under 35 U.S.C. 154(b) by 167 days.

(21) Appl. No.: 15/852,379

(22) Filed: Dec. 22, 2017

(65) Prior Publication Data

US 2018/0138747 A1 May 17, 2018

Related U.S. Application Data

(63) Continuation of application No. 14/834,289, filed on Aug. 24, 2015, now Pat. No. 9,929,595.

(60) Provisional application No. 62/041,161, filed on Aug. 25, 2014.

(51) Int. Cl.
*H02J 50/10* (2016.01)
*H02J 7/02* (2016.01)
*H02J 50/12* (2016.01)
*H02J 50/80* (2016.01)

(52) U.S. Cl.
CPC ............. *H02J 50/12* (2016.02); *H02J 7/025* (2013.01); *H02J 50/10* (2016.02); *H02J 50/80* (2016.02)

(58) Field of Classification Search
CPC ...................................... H02J 50/12
USPC ........................................ 307/104
See application file for complete search history.

(56) References Cited

U.S. PATENT DOCUMENTS

| | | | |
|---|---|---|---|
| 5,903,446 A | 5/1999 | Huillet et al. | |
| 2013/0260742 A1* | 10/2013 | Yin | H04W 24/02 455/422.1 |
| 2014/0021796 A1* | 1/2014 | Song | H01F 38/14 307/104 |
| 2014/0225439 A1 | 8/2014 | Mao | |
| 2015/0194811 A1 | 7/2015 | Mao | |
| 2016/0141882 A1* | 5/2016 | Ichikawa | H02J 7/025 307/104 |

FOREIGN PATENT DOCUMENTS

| CN | 102361357 A | 2/2012 |
|---|---|---|
| CN | 102882286 A | 1/2013 |

OTHER PUBLICATIONS

Sun Yue et al., "Frequency Stabilization Control Method for ICPT System Based on Capacitor Array" Journal of University of Electronic Science and Technology of China, vol. 43, No. 1, Jan. 2014, pp. 54-59.

* cited by examiner

Primary Examiner — Metasebia T Retebo
(74) Attorney, Agent, or Firm — Slater Matsil, LLP

(57) ABSTRACT

A system comprises a power amplifier configured to receive a frequency control signal, wherein the frequency control signal is generated based upon a system clock of a communication device and the frequency control signal is used to control a switching frequency of the power amplifier and a first resonant circuit coupled between the power amplifier and a first coil, wherein the first resonant circuit comprises a first variable capacitance network.

19 Claims, 19 Drawing Sheets

WIRELESS POWER TRANSFER SYSTEM AND METHOD

This application is a continuation of U.S. application Ser. No. 14/834,289, filed on Aug. 24, 2015, entitled "Wireless Power Transfer System and Method," which claims the benefit of U.S. Provisional Application No. 62/041,161, filed on Aug. 25, 2014, entitled "Cost-effective High Performance Wireless Power Transfer Techniques," each application is hereby incorporated herein by reference.

TECHNICAL FIELD

The present invention relates to high performance power supplies, and, in particular embodiments, to a wireless power transfer system.

BACKGROUND

As technologies further advance, wireless power transfer (WPT) has emerged as an efficient and convenient mechanism for powering or charging battery based mobile devices such as mobile phones, tablet PCs, digital cameras, MP3 players and/or the like. A wireless power transfer system typically comprises a primary side transmitter and a secondary side receiver. The primary side transmitter is magnetically coupled to the secondary side receiver through a magnetic coupling. The magnetic coupling may be implemented as a loosely coupled transformer having a primary side coil formed in the primary side transmitter and a secondary side coil formed in the secondary side receiver.

FIG. 1 illustrates a block diagram of a wireless power transfer system. The wireless power transfer system shown in FIG. 1 is an exemplary system required by the Alliance for Wireless Power (A4WP) organization. The wireless power transfer system shown in FIG. 1 includes a power transmitter and a power receiver. Through magnetic coupling, power is transferred from the power transmitter to the power receiver.

The power transmitter includes a transmitter dc/dc converter, a power amplifier, an impedance matching circuit and a resonant circuit connected in cascade between a power input and a transmitter coil. The power transmitter further comprises a transmitter Bluetooth unit having a first input/output coupled to a receiver Bluetooth unit and a second input/output coupled to the transmitter dc/dc converter of the power transmitter. The power receiver includes a resonant circuit, a rectifier, a receiver dc/dc converter connected in cascade between a receiver coil and a load. The power receiver further comprises the receiver Bluetooth unit having a second input/input coupled to the receiver dc/dc converter.

According to the standard of A4WP, the power transmitter operates at a fixed system frequency within a frequency band ranging from 6.765 MHz to 6.795 MHz (nominal 6.78 MHz). The transmitter converts dc power at its input to high frequency ac power within the frequency band. The transmitter coil, coupled to the power amplifier through a resonant circuit (usually one or more capacitors), forms a transmitter resonant tank with the resonant circuit and generates a magnetic field at the system frequency. Through magnetic coupling, power is transferred to the receiver coil nearby. Likewise, the receiver coil and the resonant circuit of the power receiver form a receiver resonant tank.

Both the resonant circuit coupled to the receiver coil and the resonant circuit coupled to the transmitter coil may comprise one or more capacitors. The resonant frequency of the transmitter resonant tank and that of the receiver resonant tank are designed to be at the system frequency, which is determined by the switching frequency of the power amplifier.

In order to match the power capability and electrical parameters of the power amplifier and those of the resonant tank in the power transmitter, an impedance matching circuit is coupled between the power amplifier and the transmitter resonant circuit as shown in FIG. 1.

The rectifier in the power receiver converts high frequency ac power from the receiver coil into dc power and delivers the dc power to the load through the receiver dc/dc converter. In the system shown in FIG. 1, for a given input voltage Vin sent to the power amplifier, the output voltage Vo at the rectifier may vary in a wide range due to a variety of factors such as the coupling coefficient changes between the transmitter and the receiver, load changes and the like. In order to control the output voltage within an acceptable range, the transmitter dc/dc converter may be employed to control the voltage sent to the power amplifier, and the receiver dc/dc converter may be employed to further regulate the voltage fed to the load. Because the input power is most likely from an ac/dc adapter plugged into an ac source, the transmitter dc/dc converter is implemented as a dc/dc converter. Similarly, the receiver dc/dc converter is usually implemented as a dc/dc converter. The load can be actual loads such as integrated circuits (ICs), a battery and the like. Alternatively, the load can be a downstream converter such as a battery charger, a dc/dc converter coupled to an actual load and the like.

The transmitter Bluetooth unit and the receiver Bluetooth unit form a Bluetooth communication subsystem providing a communication channel between the power receiver and the power transmitter. For example, the voltage control signal may be communicated through this Bluetooth communication subsystem. It should be noted that other communication techniques such as WiFi, Zigbee devices and the like, can also be used for the communication between the power transmitter and the power receiver. Furthermore, an in-band communication between the power receiver and the power transmitter can also be implemented by modulating the power signal transferred between the power receiver and the power transmitter.

The system shown in FIG. 1 includes many stages. Many components in the system shown in FIG. 1 may have high voltage/current stresses. As such, the system shown in FIG. 1 is a complex system, which causes high cost and low efficiency.

SUMMARY OF THE INVENTION

These and other problems are generally solved or circumvented, and technical advantages are generally achieved, by preferred embodiments of the present invention which improve efficiency of a wireless power transfer system.

In accordance with an embodiment, a system comprises a power amplifier configured to receive a frequency control signal, wherein the frequency control signal is generated based upon a system clock of a communication device and the frequency control signal is used to control a switching frequency of the power amplifier and a first resonant circuit coupled between the power amplifier and a first coil, wherein the first resonant circuit comprises a first variable capacitance network.

In accordance with another embodiment, a method comprises generating a frequency control signal based upon a system clock of a communication device coupled to a wireless power transfer system comprising a first resonant circuit having a first variable capacitance network and a second resonant circuit having a second variable capacitance network, configuring the wireless power transfer system to operate at a switching frequency substantially equal to a frequency of the frequency control signal and based upon a detected signal representing a current level at a turn-on transition of a power switch of the wireless power transfer system, adjusting a capacitance of the first variable capacitance network to improve soft switching of the wireless power transfer system.

In accordance with yet another embodiment, a method comprises generating a frequency control signal based upon a system clock of a communication device coupled to a wireless power transfer system comprising a transmitter magnetically coupled to a receiver, wherein the transmitter comprises a power amplifier coupled to an input power source, a transmitter resonant tank comprising a first variable capacitance network and a transmitter coil coupled to the transmitter resonant tank and the receiver comprises a receiver resonant tank comprising a second variable capacitance network and a receiver coil coupled to the receiver resonant tank and configuring the wireless power transfer system to operate at a switching frequency substantially equal to a frequency of the frequency control signal.

An advantage of a preferred embodiment of the present invention is improving a wireless power transfer system's performance through adjusting at least one resonant component of the wireless power transfer system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a wireless power transfer system having a plurality of variable capacitance networks. The invention may also be applied, however, to a variety of other power systems. Hereinafter, various embodiments will be explained in detail with reference to the accompanying drawings.

Figure 2:
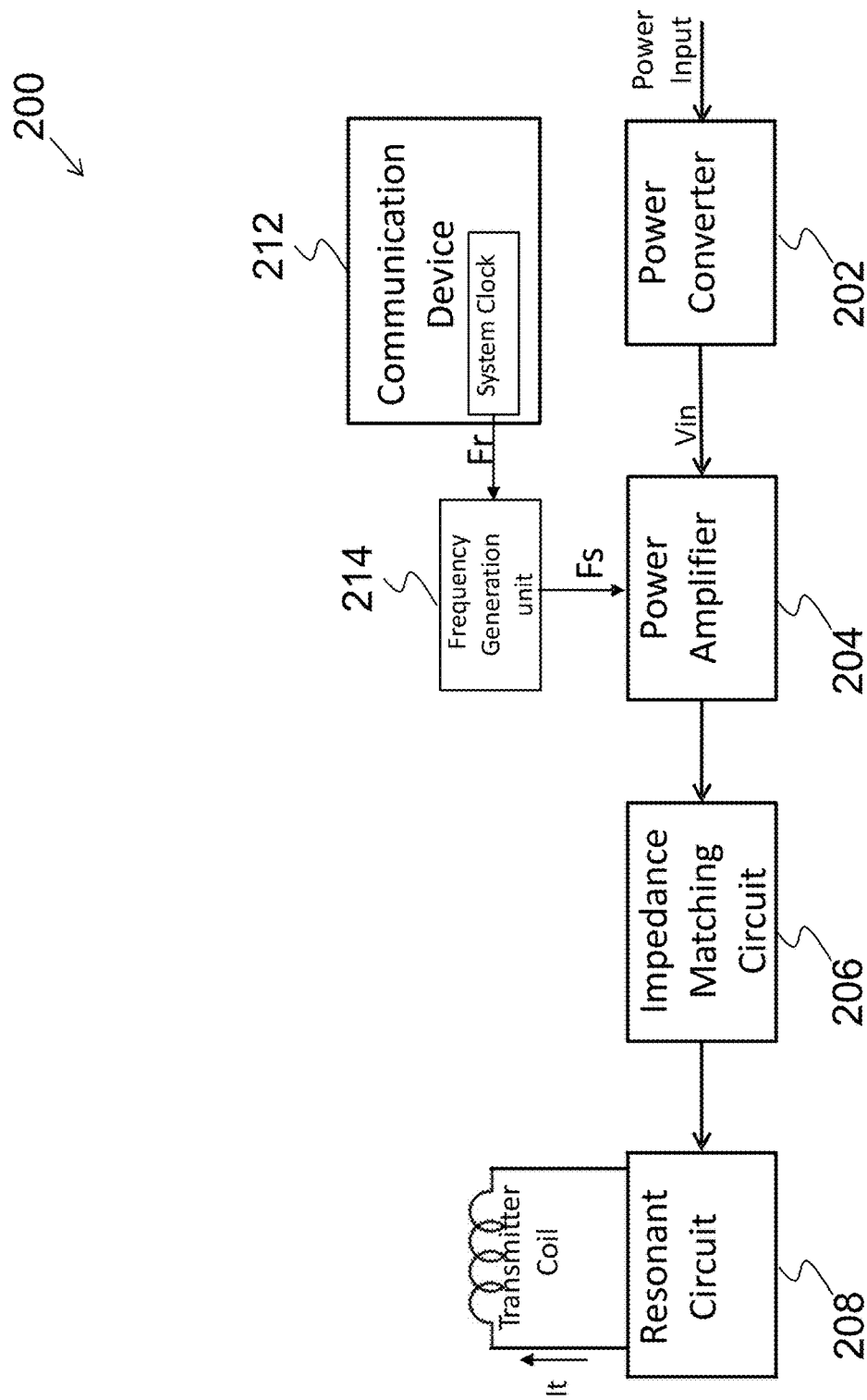
FIG. 2 illustrates a block diagram of a first implementation of a power transmitter of a wireless power transfer system in accordance with various embodiments of the present disclosure.

FIG. 2 illustrates a block diagram of a first implementation of a power transmitter of a wireless power transfer system in accordance with various embodiments of the present disclosure. The power transmitter 200 includes a power converter 202, a power amplifier 204, an optional impedance matching circuit 206 and a resonant circuit 208 connected in cascade between a power input Vin and a transmitter coil. The power transmitter 200 further comprises a communication device 212 and a frequency generation unit 214. A reference clock generated by the communication device 212 is fed into the frequency generation unit 214. The frequency generation unit 214 generates a system frequency signal fed into the power amplifier 204 as shown in FIG. 2.

To meet stringent EMC requirements of wireless power transfer systems, the power amplifier 204 of the power transmitter 200 may be required to provide a current or voltage in a sinusoidal shape. Such a current or voltage in a sinusoidal shape fed into the transmitter coil is required to be within an Industrial, Scientific and Medical (ISM) frequency band. In order to maintain the voltage or current signal generated by the power amplifier 204 within the ISM band, high-accuracy components are needed to generate a system frequency signal.

FIG. 2 illustrates a mechanism of generating a system frequency signal based upon a frequency signal in the communication system. In wireless power transfer systems, there may be several clocks available. For example, a Bluetooth device may have a plurality of system clocks such as a 3.2 kHz native clock, a reference clock, other high accuracy derived clocks, and RF clocks which correspond to the RF carrier frequencies of its physical RF channels. Both system clocks and RF clocks can be used to generate a reference signal Fr as shown in FIG. 2. In some embodiments, the system clocks have a lower frequency. Such a lower frequency signal is able to travel a longer distance without causing noise issues. As such, the system clocks may be employed as a reference frequency for the power amplifier 204. The system frequency Fs shown in FIG. 2 can be generated by using simple circuits such as counter-based frequency multipliers, frequency dividers and the like. The frequency generation unit 214 may comprise the simple circuits described above and generate the system frequency signal Fs having a frequency within a frequency band to which it is specified.

In some embodiments, the system frequency Fs has a frequency k times the reference frequency Fr, wherein k is an integer. In alternative embodiments, the system frequency Fs has a frequency equal to the reference frequency Fr divided by k. In some embodiments, the system frequency Fs is sent to the power amplifier 204 and used to control the switches of the power amplifier 204.

In some embodiments, the frequency generation unit 214 is part of a communication device. Other control and protection functions of the power transmitter may be implemented through a microcontroller, a state machine or other circuits, and may be integrated with the Bluetooth function into one IC. In alternative embodiments, the frequency generation unit 214 is part of the power amplifier 204. Furthermore, the frequency generation unit 214 may be implemented as an independent part coupled between the communication device 212 and the power amplifier 204.

Radiated RF emission is a very important concern for EMC compliance in a wireless power transfer system. One important consideration is to reduce the interference caused by the currents in the transmitter coil and the receiver coil. For this purpose, EMI filters are employed to reduce the high frequency components of the currents in the transmitter coil as well as the high frequency components of the currents in the receiver coil.

Figure 1:
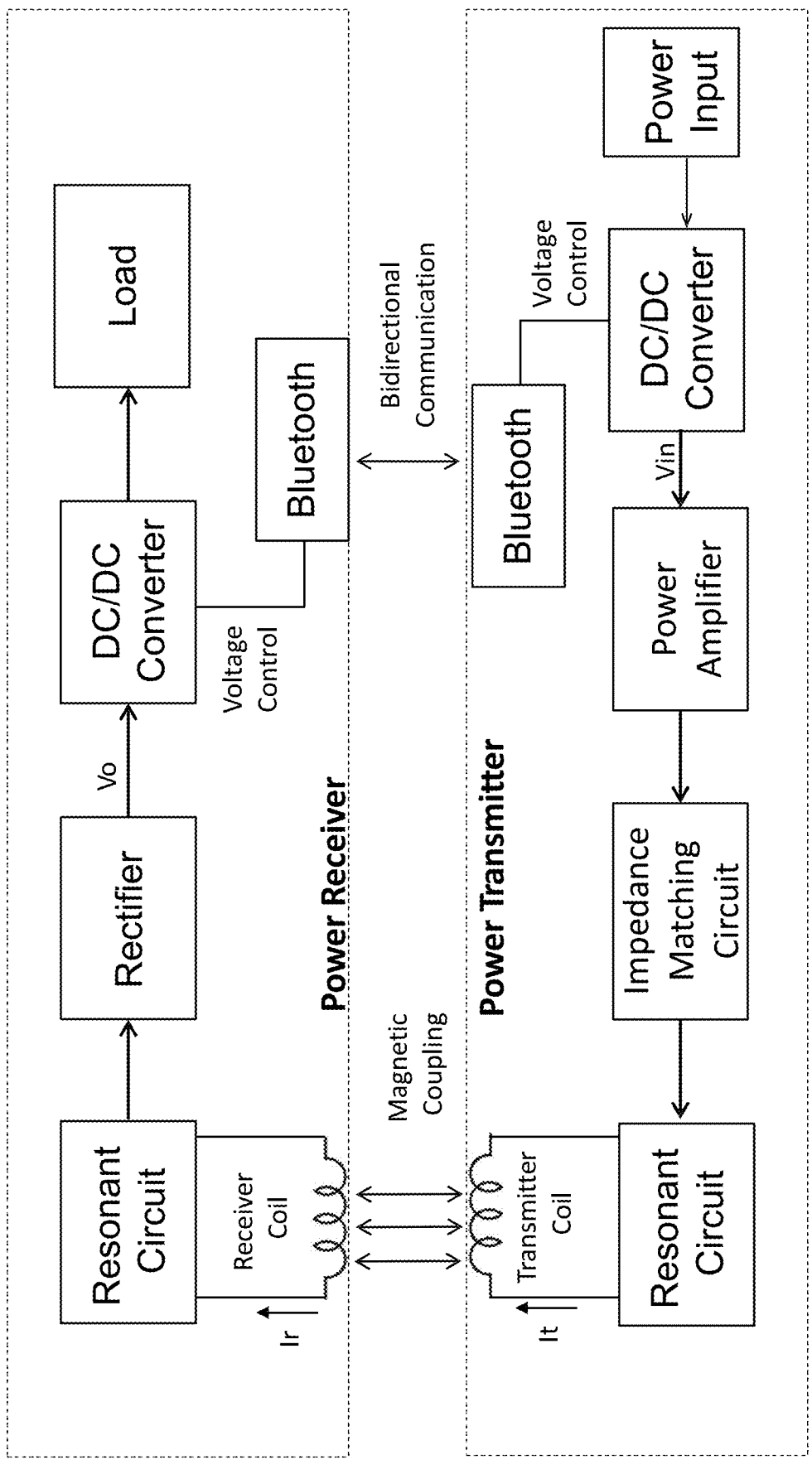
FIG. 1 illustrates a block diagram of a wireless power transfer system.
Figure 3:
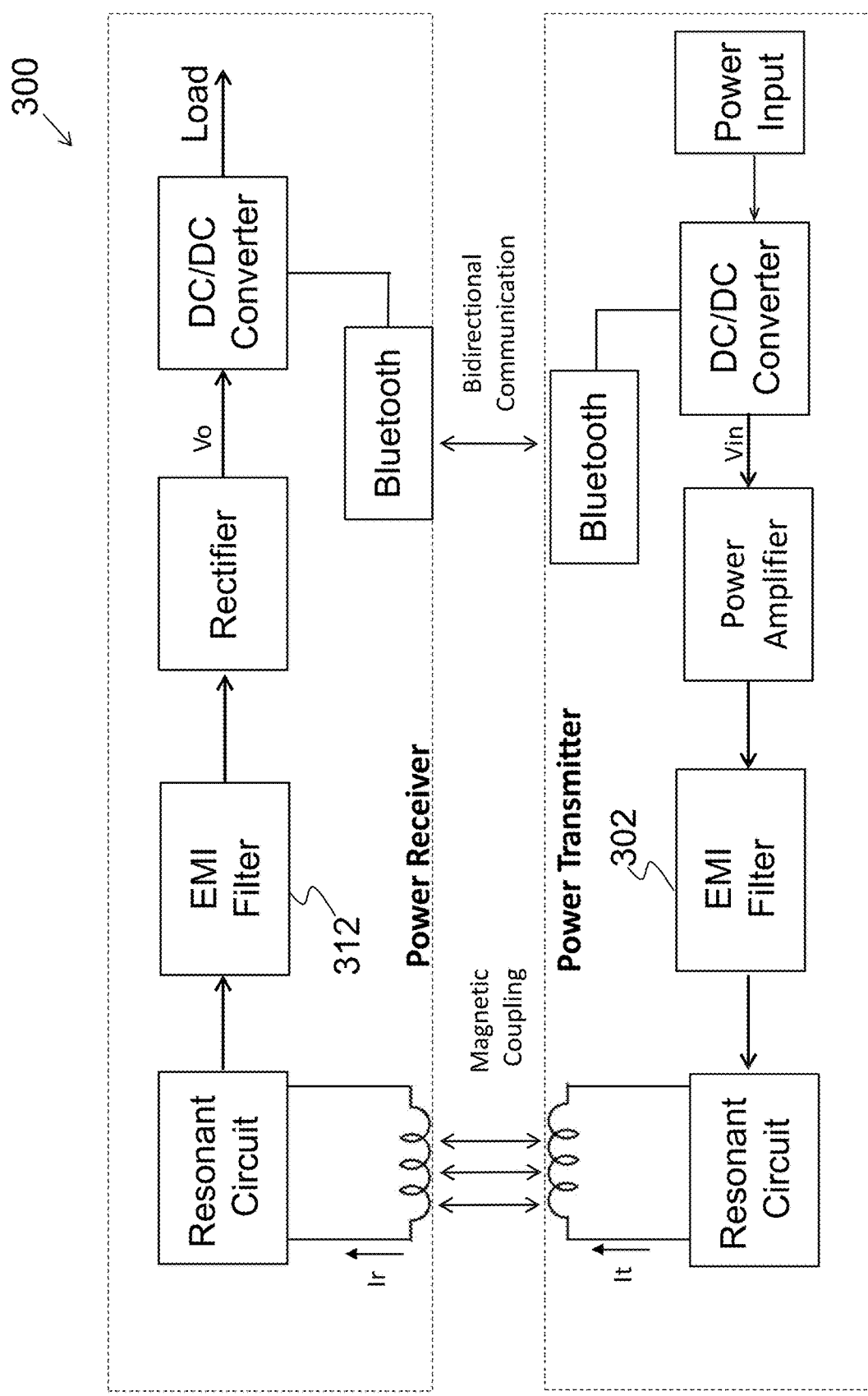
FIG. 3 illustrates a block diagram of a wireless power transfer system in accordance with various embodiments of the present disclosure.

FIG. 3 illustrates a block diagram of a wireless power transfer system in accordance with various embodiments of the present disclosure. The block diagram of the wireless power transfer system 300 shown in FIG. 3 is similar to that shown in FIG. 1 except that a first EMI filter 302 is coupled between the power amplifier and the resonant circuit of the power transmitter, and a second EMI filter 312 is coupled between the resonant circuit and the rectifier of the power receiver. For simplicity, only the first EMI filter 302 and the second EMI filter 312 are described in detail herein. It should be noted that the impedance matching circuit shown in FIG. 1 can be placed before or after the first EMI filter 302. Furthermore, the impedance matching circuit may be part of the first EMI filter 302.

In some applications, it's also feasible to have an EMI filter only in the power transmitter, or only in the power receiver. In some embodiments, the EMI filters shown in FIG. 3 may have different configurations such as low-pass filters, band-pass filters and other suitable topologies. In some embodiments, the EMI filters shown in FIG. 3 may comprise inductors and capacitors which form resonant circuits with one or more resonant frequencies. The detailed structures of the EMI filters will be described below with respect to FIGS. 4-5.

Figure 4:
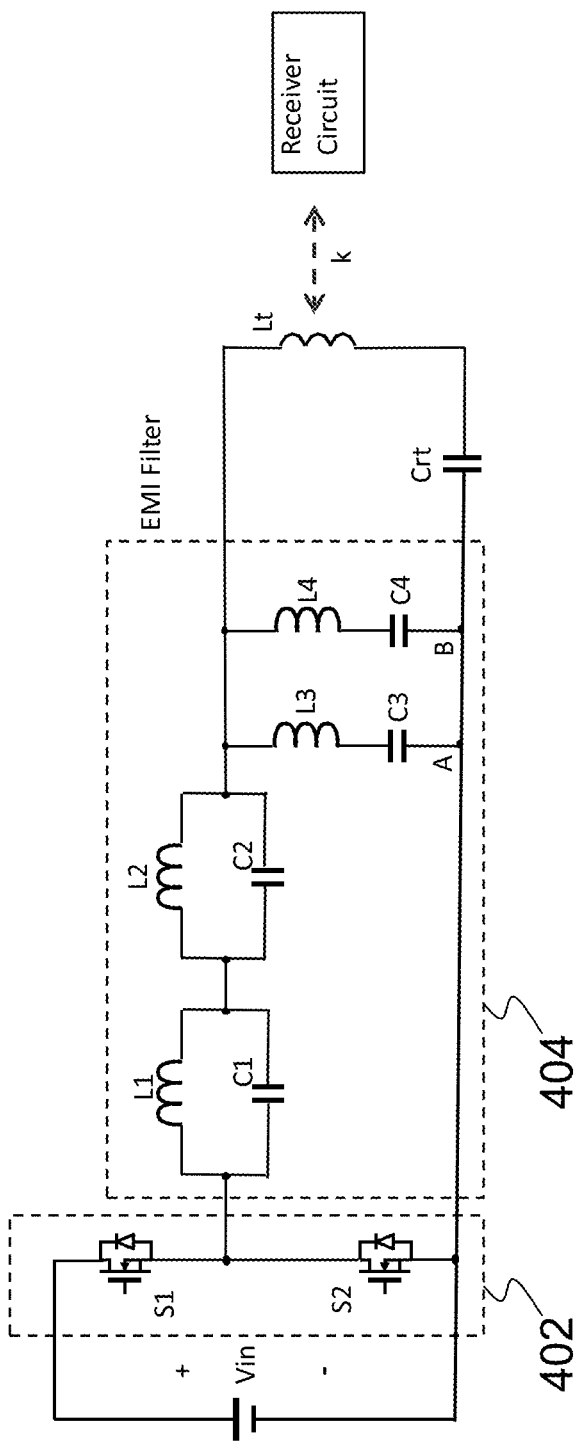
FIG. 4 illustrates a schematic diagram of a first illustrative implementation of the first EMI filter of the wireless power transfer system shown in FIG. 3 in accordance with various embodiments of the present disclosure.

FIG. 4 illustrates a schematic diagram of a first illustrative implementation of the first EMI filter of the wireless power transfer system shown in FIG. 3 in accordance with various embodiments of the present disclosure. FIG. 4 shows a power transmitter is coupled to a power receiver. A detailed schematic diagram of the power receiver is not shown for the sake of brevity. The power transmitter comprises a power amplifier 402, an EMI filter 404 and a resonant circuit comprising Crt connected in series between Vin and the transmitter coil Lt.

In some embodiments, the power amplifier 402 is implemented as a class-D power amplifier as shown in FIG. 4. The power amplifier 402 comprises switches S1 and S2 connected in series between two terminals of Vin. The common node of switches S1 and S2 is connected to an input of the EMI filter 404. It should be noted that the impedance matching circuit is not shown. Depending on different applications and design needs, the impedance matching circuit can be placed before or after the EMI filter 404.

The EMI filter 404 comprises inductors L1, L2, L3 and L4, and capacitors C1, C2, C3 and C4. As shown in FIG. 4, L1 and C1 are connected in parallel. L2 and C2 are connected in parallel. L3 and C3 are connected in series. L4 and C4 are connected in series. In some embodiments, L1 and C1 form a first harmonic trap circuit; L2 and C2 form a second harmonic trap circuit; L3 and C3 form a first harmonic notch circuit; L4 and C4 form a second harmonic notch circuit.

It should be noted that FIG. 4 illustrates only one capacitor is included in each harmonic suppression circuit. This is merely an example. Each harmonic suppression circuit shown in FIG. 4 may include hundreds of such capacitors. The number of capacitors illustrated herein is limited solely for the purpose of clearly illustrating the inventive aspects of the various embodiments. The present invention is not limited to any specific number of capacitors.

The resonant frequencies of the harmonic trap circuits and harmonic notch circuits can be set to the frequencies at which harmonics will be suppressed. In some embodiments, a harmonic trap circuit and a corresponding harmonic notch circuit can have the same resonant frequency. For example, in FIG. 4, both the first harmonic trap circuit comprising L1 and C1, and the first harmonic notch circuit comprising of L3 and C3 can be designed for suppressing the 3rd harmonic. Since the 3rd harmonic is a dominant harmonic, it needs more filtering than other higher order harmonics. Using both the first harmonic trap circuit and the first harmonic notch circuit to suppress the $3^{rd}$ harmonic helps the EMI filter achieve better harmonic suppression.

In some embodiments, the second harmonic trap circuit comprising L2 and C2 can be set for suppressing the 5th harmonic. The second harmonic notch circuit comprising of L4 and C4 can be set for suppressing the 7th harmonic. As such, the 3rd, 5th and 7th harmonic currents will be reduced significantly, and other higher order harmonics can also be suppressed. As a result, the current in the transmitter coil Lt will be substantially sinusoidal. It should be noted that in order to achieve better system performance, it is desirable to have a low inductance path in any harmonic trap circuit shown in FIG. 4 and a low capacitance path in any harmonic notch circuit shown in FIG. 4. Such a configuration helps to reduce the impact on the wireless power transfer system operating at the fundamental frequency. It should be noted that the fundamental frequency is equal to or approximately equal to the system frequency of the wireless power transfer system.

In practical filter implementations, it is important to make sure that key resonant frequencies of the EMI filter match the frequencies to which they are specified. For example, it is desirable that the resonant frequencies of the harmonic trap circuits and the harmonic notch circuits are close to the desired values. In order to achieve this with minimum costs and efforts, some inductors and capacitors shown in FIG. 4 can be integrated into one package using suitable semiconductor fabrication processes. The values of inductors and/or capacitors can be trimmed in the fabrication processes so as to achieve the required resonant frequencies. The detailed trimming process will be described below with respect to FIG. 5.

Figure 5:
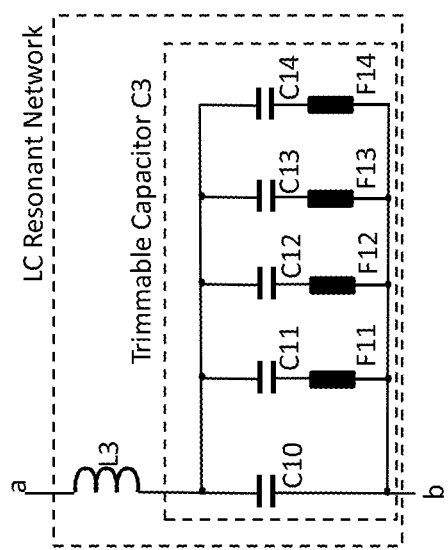
FIG. 5 illustrates a schematic diagram of a first illustrative implementation of the harmonic notch circuit shown in FIG. 4 in accordance with various embodiments of the present disclosure.

FIG. 5 illustrates a schematic diagram of a first illustrative implementation of the harmonic notch circuit shown in FIG. 4 in accordance with various embodiments of the present disclosure. The harmonic notch circuit shown in FIG. 4 comprises L3 and C3. In the first implementation of the harmonic notch circuit shown in FIG. 5, C3 may be replaced by a plurality of capacitors. As shown in FIG. 5, C3 is a trimmable capacitor including C10, C11, C12, C13 and C14.

In some embodiments, both L3 and C3 may be fabricated on a same substrate. The capacitor C3 is manufactured onto a semiconductor substrate using a first semiconductor fabrication process. The inductor L3 is manufactured onto the semiconductor substrate comprising the capacitor C3. In alternative embodiments, L3 is manufactured onto a separate semiconductor substrate, and then stacked on the semiconductor substrate comprising the capacitor C3. Furthermore, L3 is manufactured onto a separate substrate coupled to the semiconductor substrate comprising the capacitor C3. Furthermore, L3 may be a discrete component coupled to the package comprising the capacitor C3. The fabrication processes above are well known in the art, and hence are not discussed in further detail herein.

In some embodiments, all capacitors shown in FIG. 5 are capacitors fabricated on a semiconductor substrate. In alternative embodiments, at least one capacitor (e.g., capacitor C10) is a discrete capacitor coupled to the semiconductor substrate on which the other capacitors are fabricated. The capacitance of the discrete capacitor is greater than the total capacitance of the capacitors fabricated on the semiconductor substrate.

As shown in FIG. 5, capacitor C10 and inductor L3 are connected in series. Capacitor C11 and a first trim device F11 are connected in series and further connected in parallel with capacitor C10. Likewise, capacitor C12 and a second trim device F12 are connected in series and further connected in parallel with capacitor C10; capacitor C13 and a third trim device F13 are connected in series and further connected in parallel with capacitor C10; capacitor C14 and a fourth trim device F14 are connected in series and further connected in parallel with capacitor C10. It should be recognized that while FIG. 5 illustrates the trimmable capacitor C3 comprising four trim devices and their corresponding capacitors, the trimmable capacitor C3 could accommodate any number of trim devices and their corresponding capacitors.

During the fabrication process of the trimmable capacitor C3, each trim device is initially in a short circuit condition. Depending on design needs, the trim device shown in FIG. 5 may be turned into an open circuit so as to change the total capacitance of the trimmable capacitor C3. In some embodiments, the trim device shown in FIG. 5 may be implemented as any suitable semiconductor elements such as a metal trace, a fuse, a low-value resistor or any similar components having a value change from a short-circuit (low resistance) state to an open-circuit (high resistance) state by applying electrical energy to it or through a mechanical force such as laser cutting.

During the fabrication process, a variety of factors may have an impact on the final values of L3 and C10. Furthermore, the interconnect components coupled between L3 and C10 may result in further inaccuracies of the resonant frequency of the LC resonant network. By changing the state of the trim devices, the accuracy of the resonant frequency may be improved by selecting the number of capacitors connected in parallel with C10.

In some embodiments, the capacitors shown in FIG. 5 follow a binary relationship so as to simplify the trim process. In particular, the capacitance of C11 is equal to one half of the capacitance of C10; the capacitance of C12 is equal to one half of the capacitance of C11; the capacitance of C13 is equal to one half of the capacitance of C12; the capacitance of C14 is equal to one half of the capacitance of C13.

The values of these trim devices can be decided in the manufacturing process by assessing the actual values of the capacitor C3 and the inductor L3, or by assessing the impedance of the LC network. For example, after L3 and C3 have been manufactured onto the package, the impedance between point a and point b shown in FIG. 5 can be tested with all capacitors C10 through C14 connected in parallel to find the resonant frequency of the LC series resonant circuit. By comparing the measured resonant frequency with the desired resonant frequency, it is possible to figure out the percentage of capacitance to be trimmed out. Then the corresponding trim devices can be turned into an open-circuit state to get the appropriate capacitance for C3.

It should be noted that the trimming process described above with respect to FIG. 5 is merely an example. A person skilled in the art would understand the trimming process may be applicable to other EMI elements shown in FIG. 4.

A complex LC network such as a plurality of the harmonic trap circuits and harmonic notch circuits, or even the EMI filters shown in FIG. 4, can be integrated into a package with the help of semiconductor manufacturing process in a similar way. To get the desired resonant frequencies, a plurality of capacitors can be trimmed in a manner similar to that shown in FIG. 5.

It should be noted that when a trimming process is applicable to multiple branches in parallel, it is important that the parallel connection should be not connected inside the package. For example, if C3 and/or C4 of the EMI filter shown in FIG. 4 need to be trimmed, point A and point B shown in FIG. 4 should be connected individually to two separate interconnection pins of the package, but not shorted inside the package. By connecting these points outside the package, the value of each component as well as the impedance of each branch (e.g., one comprising of L3 and C3, and another comprising of L4 and C4) can be measured correctly. In some embodiments, these two interconnection pins can be connected together by a metal trace later on a system board. In this way, the filter functions will be performed at the system level, while parallel branches of the filter elements can be trimmed individually since these two branches are separated from each other during the trimming process.

It should be note that the EMI filter topologies shown in FIGS. 4-5 are merely examples, which should not unduly limit the scope of the claims. One of ordinary skill in the art would recognize many variations, alternatives, and modifications. It should further be noted that all or part of the EMI filters shown in FIGS. 4-5 may be integrated with the power amplifier and/or the coils by using suitable fabrication processes.

Figure 6:
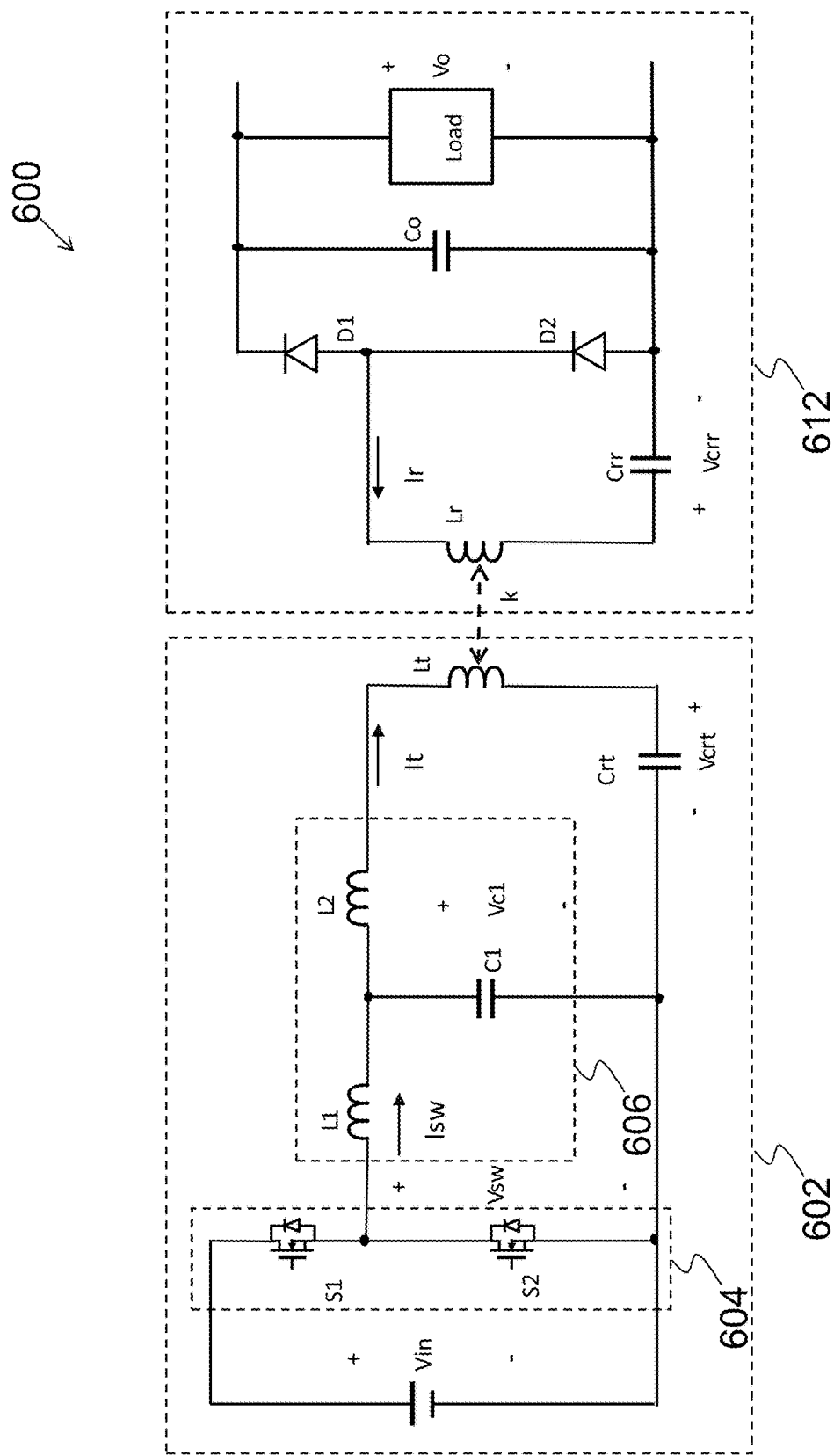
FIG. 6 illustrates a schematic diagram of a wireless power transfer system having an impedance matching circuit in accordance with various embodiments of the present disclosure.

FIG. 6 illustrates a schematic diagram of a wireless power transfer system having an impedance matching circuit in accordance with various embodiments of the present disclosure. The wireless power transfer system 600 comprises a transmitter 602 and a receiver 612. The transmitter 602 comprises a power amplifier 604 formed by S1 and S2 connected in series, an impedance matching circuit 606, a transmitter resonant circuit formed by Crt coupled between Vin and a transmitter coil Lt. The receiver 612 comprises a receiver resonant circuit formed by Crr, a rectifier formed by D1 and D2 and an output capacitor Co coupled between a receiver coil Lr and a load.

The impedance matching circuit 606 comprises a first inductor L1, a second inductor L2 and a first capacitor C1. As shown in FIG. 6, the first inductor L1 and the second inductor L2 are connected in series. The first capacitor C1 is connected to the common node of the first inductor L1 and the second inductor L2.

In some embodiments, the values of L1, L2 and C1 are calculated based upon the impedance matching requirements of the wireless power transfer system 600. However, if these components are chosen just based on the calculated values, S1 and S2 may not achieve soft-switching. As a result, the power losses in the power amplifier may be excessively high. In some embodiments, the value of C1 may be adjusted to a value slightly away from the calculated value of C1. By adjusting the value of C1, the power amplifier 604 may achieve soft-switching with a minimum impact on the impedance matching function of the impedance matching circuit 606.

Figure 7:
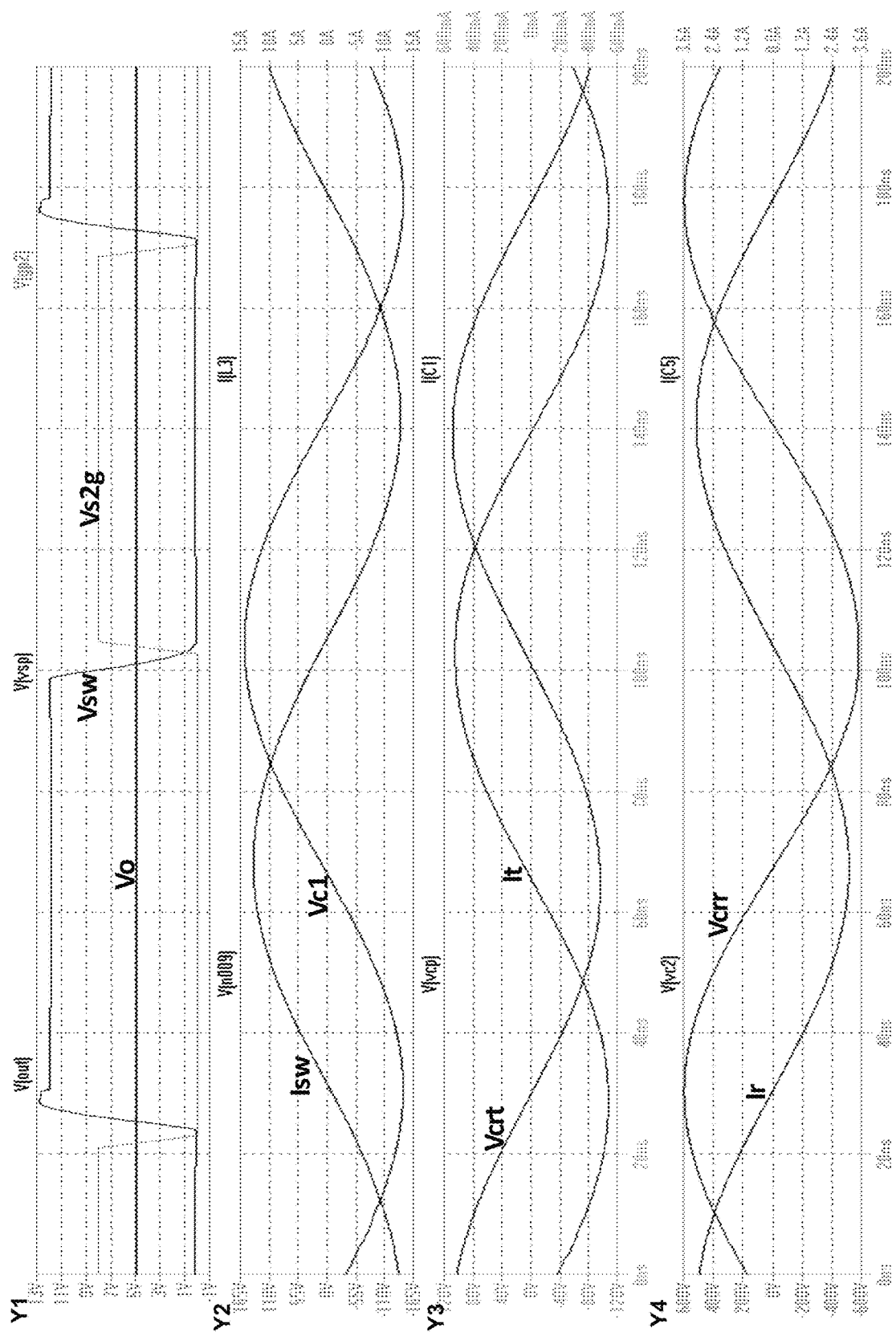
FIG. 7 illustrates a variety of waveforms associated with the wireless power transfer system shown in FIG. 6 in accordance with various embodiments of the present disclosure.

FIG. 7 illustrates a variety of waveforms associated with the wireless power transfer system shown in FIG. 6 in accordance with various embodiments of the present disclosure. The horizontal axis of FIG. 7 represents intervals of time. The unit of the horizontal axis is nanosecond. There may be four vertical axes. The first vertical axis Y1 represents the voltage ($V_{SW}$) across the drain-to-source of the switch S2, the gate drive voltage ($V_{s2g}$) of the switch S2 and the output voltage Vo. The second vertical axis Y2 represents the current ($I_{SW}$) flowing through the first inductor L1 and the voltage ($V_{C1}$) across the first capacitor C1. The third vertical axis Y3 represents the current ($I_t$) flowing through the transmitter coil Lt and the voltage ($V_{crt}$) across the capacitor Crt. The fourth vertical axis Y4 represents the current ($I_r$) flowing through the receiver coil Lr and the voltage ($V_{crr}$) across the capacitor Crr.

From the waveform of Vsw, it is clear that the power switches (e.g., power switch S2) are turned on with a voltage approximately equal to zero. As a result, soft-switching is achieved. Vs2g is the gate drive voltage of S2. As shown in FIG. 7, Vs2g starts to rise after Vsw is reduced to a voltage approximately equal to zero. It should be noted that the soft switching described above is achieved through adjusting the capacitance of C1 in response to different operating conditions such as different output power and/or different input voltages. Furthermore, the adjustment of the capacitance of C1 is also related to the changes of the inductance of the transmitter coil, the inductance of the receiver coil and/or the coupling between the transmitter coil and the receiver coil.

To maintain soft-switching over a wide range of operating conditions without causing too much current and voltage stresses on the power components in the transmitter, it is better to change the capacitance of C1 adaptively. U.S. patent application Ser. No. 14/177,049 entitled "High Efficiency High Frequency Resonant Power Conversion" by the same inventor of the present application discloses techniques to change the capacitance adaptively. Such techniques can be applicable to the present application so as to change the capacitance of C1 in real time. In other words, the capacitance of C1 can be adjusted or modulated dynamically according to different system needs.

Figure 8:
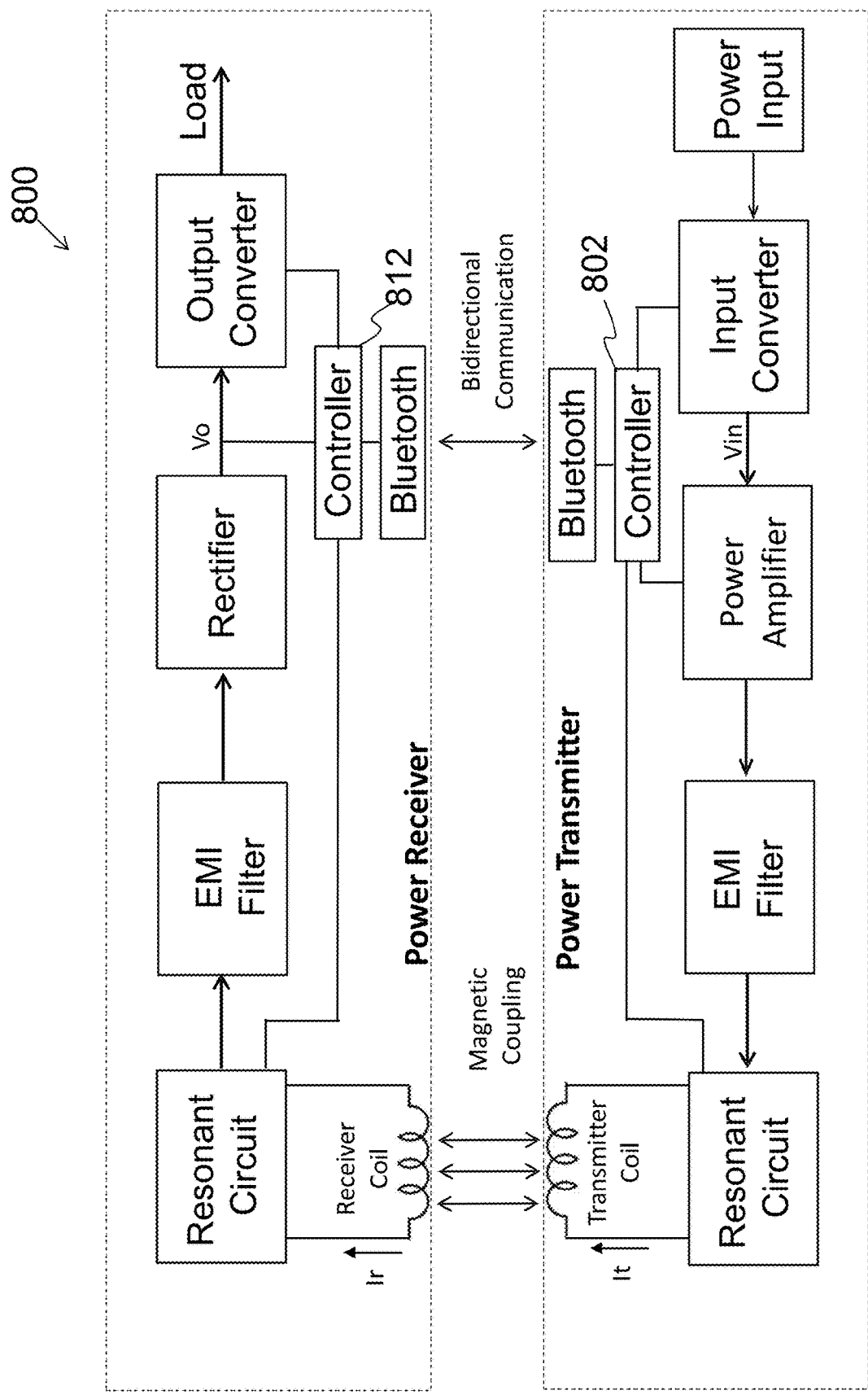
FIG. 8 illustrates a block diagram of a wireless power transfer system with better efficiency on the basis of controlled resonance enabled by a variable capacitance technique in accordance with various embodiments of the present disclosure.

FIG. 8 illustrates a block diagram of a wireless power transfer system with better efficiency on the basis of controlled resonance enabled by a variable capacitance technique in accordance with various embodiments of the present disclosure. The structure of the wireless power transfer system 800 shown in FIG. 8 is similar to that shown in FIG. 3 except that a transmitter controller 802 and a receiver controller 812 are employed to adjust the capacitances of the transmitter resonant circuit and the receiver resonant circuit respectively.

The transmitter controller 802 takes information from the input power converter, the power amplifier, the transmitter resonant tank and the Bluetooth communication unit in the transmitter. Based upon the information, the transmitter controller 802 is capable of adjusting the operation of the power transmitter by modulating the capacitance and/or inductance in the transmitter resonant circuit coupled to the transmitter coil. Furthermore, the transmitter controller 802 is able to dynamically change the timing of the switches in the power amplifier and change the input voltage Vin fed into the power amplifier.

The receiver controller 812 takes information from the output power converter, the output voltage of the rectifier Vo, the receiver resonant circuit and the Bluetooth communication unit in the receiver. Based upon the information, the receiver controller is capable of adjusting the operation of the receiver by modulating the capacitance and/or inductance in the receiver resonant tank coupled to the receiver coil.

In this way, the local controllers (e.g., the transmitter controller 802 and the receiver controller 812) provide fast control actions, while the Bluetooth communication units can provide slow control and adjustment functions. It should be noted that impedance matching circuit is optional to the system shown in FIG. 8 and may not be needed during the majority of time, so it is not shown in FIG. 8 for the sake of brevity.

One advantageous feature of having the capacitance modulation technique described above is that the resonant frequencies of the transmitter resonant circuit and the receiver resonant circuit can be dynamically fine-tuned so that the resonant frequencies are equal to or approximately equal to the system frequency of the wireless power transfer system (e.g., 6.78 MHz in an A4WP based system). As a result, the efficiency of the wireless power transfer system 800 is improved.

Another advantageous feature of having the capacitance modulation technique described above is the power processing including the power transfer between the power transmitter and the power receiver may be improved. For example, the output voltage Vo may be regulated through modulating the capacitances. Such a regulated output voltage helps to save the output power converter and/or the input power converter shown in FIG. 8. As a result, the system cost may be reduced. The detailed implementation of this advantageous feature will be described below with respect to FIGS. 9-15.

Figure 9:
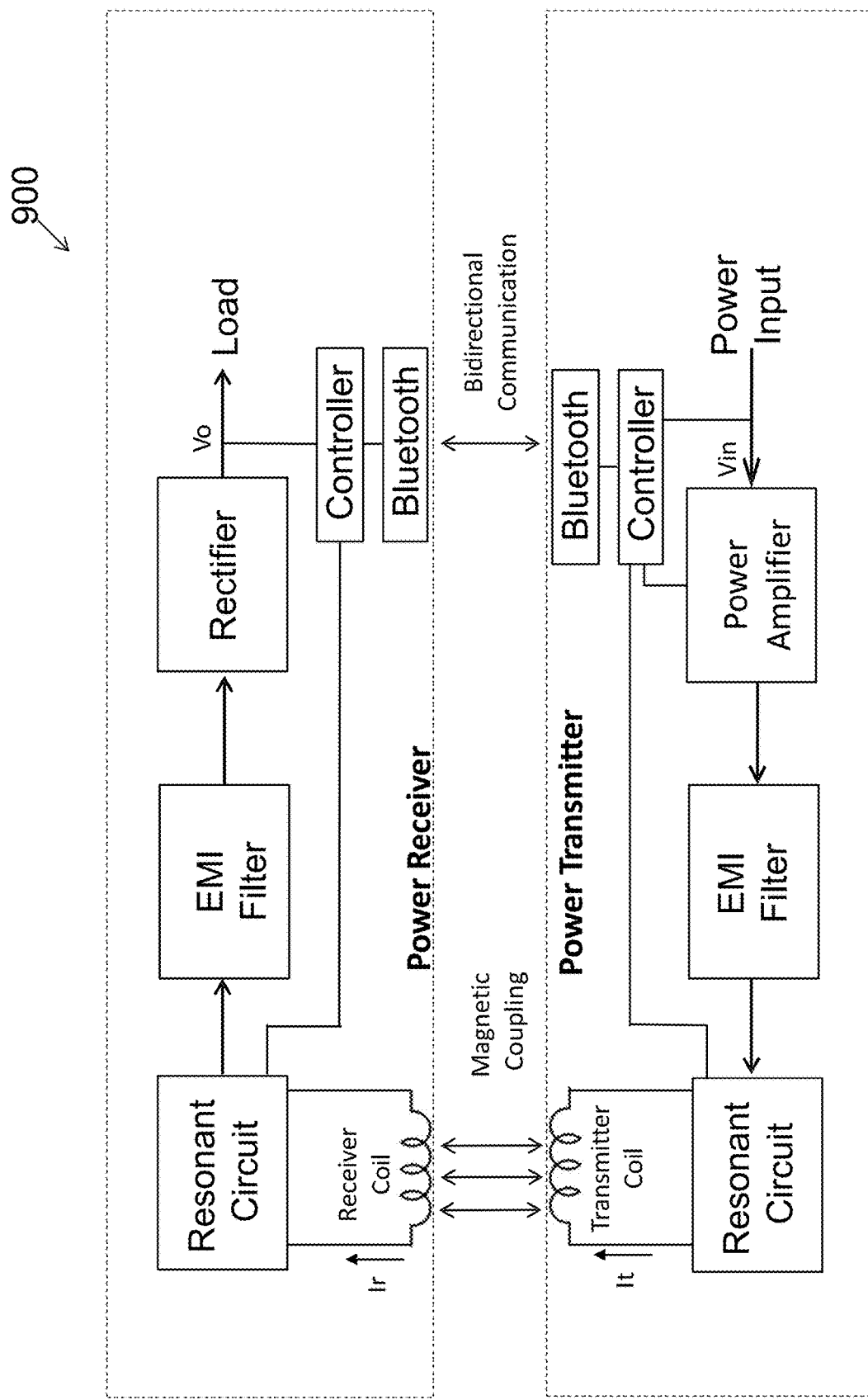
FIG. 9 illustrates a block diagram of a wireless power transfer system controlled by a resonant component modulation technique in accordance with various embodiments of the present disclosure.

FIG. 9 illustrates a block diagram of a wireless power transfer system controlled by a resonant component modulation technique in accordance with various embodiments of the present disclosure. The wireless power transfer system 900 is similar to the system shown in FIG. 8 except that both the input power converter and the output power converter shown in FIG. 8 have been removed as a result of applying the resonant component modulation technique to the wireless power transfer system 900.

In the wireless power transfer system 900, the power control, the output voltage regulation and the soft-switching operation for the power switches are achieved by modulating the resonant component values in the transmitter resonant circuit and the receiver resonant circuit. The resonance modulation technique is employed to adjust the impedance of the resonant tanks dynamically, thereby controlling both the reactive power and active power of the wireless power transfer system 900.

It is important to regulate both the active power and reactive power to maintain an optimum operation of the system. Especially, the impedance of the power receiver presented to the power transmitter can be adjusted by modulating the impedance of the power receiver. Thus, the modulation of the impedance of the power receiver plays a role similar to the function of an impedance matching circuit. In other words, the impedance matching circuit (not shown) in the receiver may be replaced by modulating the impedance of the power receiver. As a result, it is not necessary to have a separate impedance matching circuit in the power receiver and/or the power transmitter.

Figure 10:
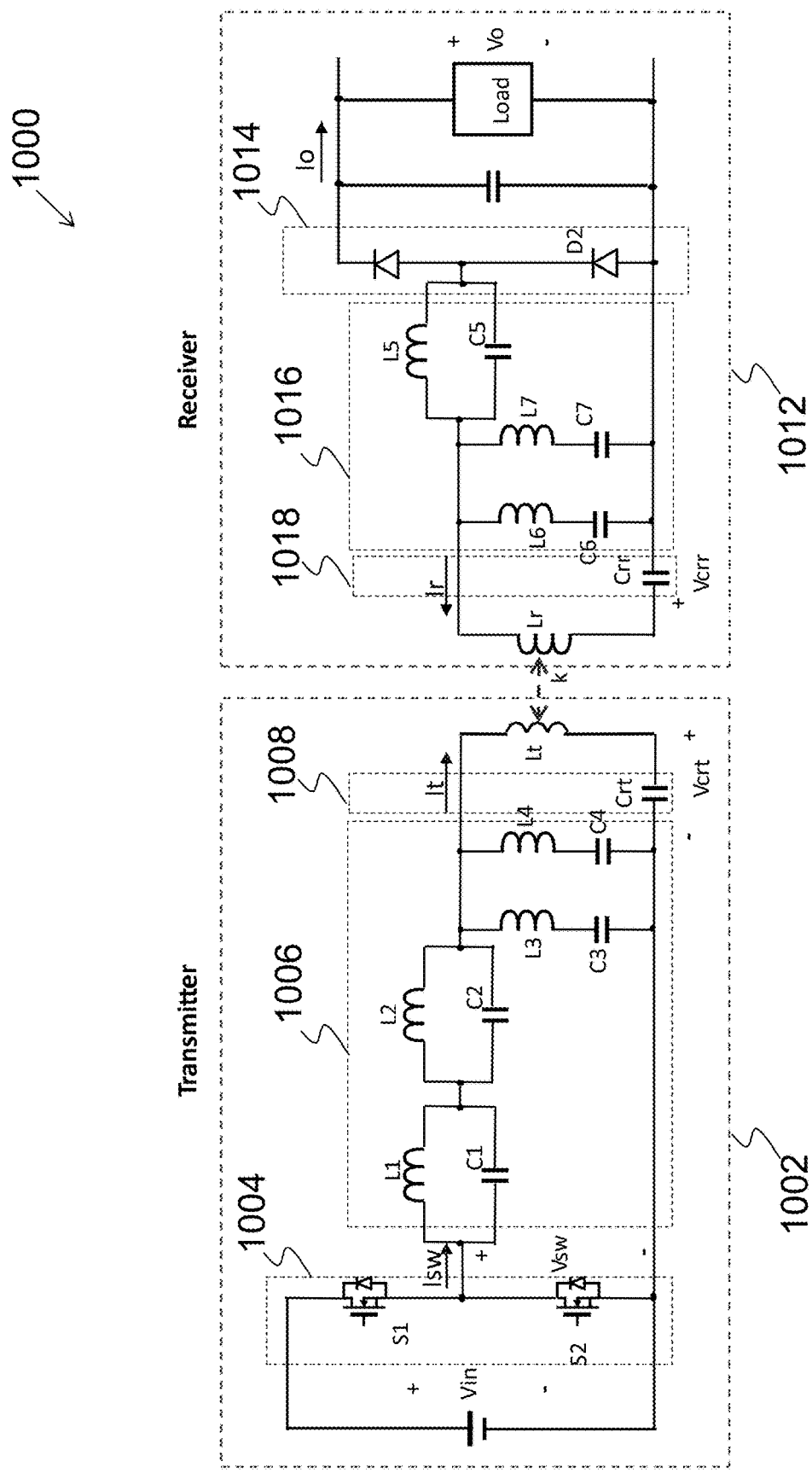
FIG. 10 illustrates a schematic diagram of the wireless power transfer system shown in FIG. 9 in accordance with various embodiments of the present disclosure.

FIG. 10 illustrates a schematic diagram of the wireless power transfer system shown in FIG. 9 in accordance with various embodiments of the present disclosure. The wireless power transfer system 1000 comprises a power transmitter 1002 and a power receiver 1012 coupled together through magnetic coupling. The strength of coupling between the power transmitter 1002 and the power receiver 1012 is quantified by the coupling coefficient k. In some embodiments, k is in a range from about 0.05 to about 0.9. Although only one receiver is shown in FIG. 10, multiple receivers may be coupled to the power transmitter 1002.

The power transmitter 1002 comprises a power amplifier 1004, a transmitter EMI filter 1006, a transmitter resonant circuit 1008 connected in series between Vin and a transmitter coil Lt. The power amplifier 1004 is implemented as a class D power amplifier comprising switches S1 and S2. The power amplifier 1004 shown in FIG. 10 is a voltage-fed half-bridge topology. It should be noted that the power topology of the power amplifier 1004 shown in FIG. 10 is merely an example. A person skilled in the art will recognize there may be many alternatives, variations and modifications. For example, other suitable voltage-fed topologies such as full-bridge converters, push-pull converters could be employed. Furthermore, current-fed topologies such as class-E and current-fed push-pull topologies may also be used.

The transmitter EMI filter 1006 comprises inductors L1, L2, L3 and L4, and capacitors C1, C2, C3 and C4. As shown in FIG. 10, L1 and C1 are connected in parallel. L2 and C2 are connected in parallel. L3 and C3 are connected in series. L4 and C4 are connected in series. In some embodiments, L1 and C1 form a first harmonic trap circuit; L2 and C2 form a second harmonic trap circuit; L3 and C3 form a first harmonic notch circuit; L4 and C4 form a second harmonic notch circuit.

The transmitter resonant circuit 1008 comprises a resonant capacitor Crt. Crt can be implemented as a capacitor having variable capacitance. For example, Crt may be implemented as a capacitor and switch network as described in U.S. patent application Ser. No. 14/177,049. The capacitance of Crt can be modulated by controlling the gate signals applied to the switches in the capacitor and switch networks according to different system operating conditions. The arrangement of the capacitors and switches in the capacitor and switch networks is designed such that the capacitor and switch networks are capable of generating a large number of capacitance variation steps, which offer an almost continuous variation of the capacitance of Crt in a wide range.

The power receiver 1012 comprises a rectifier 1014, a receiver EMI filter 1016, a receiver resonant circuit 1018 connected in series between a load and a receiver coil Lr. The receiver EMI filter 1016 comprises inductors L5, L6, and L7, and capacitors C5, C6, and C7. As shown in FIGS. 10, L5 and C5 are connected in parallel. L6 and C6 are connected in series. L7 and C7 are connected in series. In some embodiments, L5 and C5 form a harmonic trap circuit in the receiver EMI filter 1016; L6 and C6 form a first harmonic notch circuit in the receiver EMI filter 1016; L7 and C7 form a second harmonic notch circuit in the receiver EMI filter 1016.

The rectifier 1014 comprises diodes D1 and D2. In alternative embodiments, D1 and D2 can also be implemented as synchronous rectifiers. For example, MOSFETs are controlled to emulate diode functions. Furthermore, the rectifier 1014 may be formed by other types of controllable devices such as bipolar junction transistor (BJT) devices, super junction transistor (SJT) devices, insulated gate bipolar transistor (IGBT) devices, gallium nitride (GaN) based power devices and/or the like. The detailed operation and structure of the rectifier 1014 are well known in the art, and hence are not discussed herein.

The receiver resonant circuit 1018 comprises a resonant capacitor Crr. Crt can be implemented as a capacitor having variable capacitance. For example, Crr may be implemented as a capacitor and switch network as described in U.S. patent application Ser. No. 14/177,049. The capacitance of Crr can be modulated by controlling the gate signals applied to the switches in the capacitor and switch networks according to different system operating conditions. The arrangement of the capacitors and switches in the capacitor and switch networks is designed such that the capacitor and switch networks are capable of generating a large number of capacitance variation steps, which offer an almost continuous variation of the capacitance of Crr in a wide range.

Lt and Lr are the transmitter coil of the transmitter 1002 and the receiver coil of the receiver 1012 respectively. In operation, Lt and Lr are placed in proximity physically, so their magnetic fields are coupled together. The coupling between Lt and Lr depends on the relative position and orientation of these two coils, and thus may vary in a wide range in a practical wireless power transfer system.

The load can be actual loads such as integrated circuits (ICs), a battery and the like. Alternatively, the load can be a downstream converter such as a battery charger, a dc/dc converter coupled to an actual load and the like.

In some embodiments, the output voltage Vo is a regulated voltage. In alternative embodiments, the output voltage Vo is maintained within a range to which it is specified. The output power of the wireless power system 1000 is equal to the output voltage Vo times the output current Io. In some embodiments, the output current Io as well as the output power Po may vary in a wide range depending on different operating condition, while the output voltage Vo is either a regulated voltage or within a narrow range (e.g., +/−10% of the regulated voltage).

As described above with respect to FIG. 10, both Crt and Crr can be modulated in response to different system operating conditions. As such, there may be two control variables derived from modulating Crt and Crr. One control variable may be used to control the output voltage as well as the output power. The other control variable may be used to improve the performance of the wireless power transfer system such as improving efficiency, reducing voltage and current stresses, maximizing the power transfer and/or the like.

The performance improvement may be realized through improving the efficiency of the wireless power transfer system. Since the wireless power transfer system is a complex system, it is a slow and difficult process to improve the efficiency of such a complex system. In some embodiments, better efficiency may be achieved by operating the power amplifier based upon the following two principles.

In accordance with a first principle of achieving soft switching, both S1 and S2 can achieve soft switching if S1 and S2 are turned on when the voltages across S1 and S2 are equal to or approximately equal to zero. In accordance with a second principle, the efficiency of the wireless power transfer system may be further improved when the current Isw of the power amplifier 1004 is kept low during the turn-on transitions of S1 and S2 because a lower Isw helps to reduce the switching losses as well as the conduction losses of S1 and S2. In other words, in order to achieve a better soft switching condition, Isw should lag the voltage Vsw to a certain degree. For example, the wireless power transfer system should have just enough inductive reactive power at the output port of the power amplifier 1004 so that the voltage across S1 and S2 can be reduced to a level equal to or approximately equal to zero prior to the turn-on transitions of S1 and S2.

In accordance with the first principle, the efficiency improvement may be achieved by monitoring the voltage across power switch S1 and/or the voltage across power switch S2. More particularly, monitoring the voltage across a power switch (e.g., S2) includes finding whether the voltage across the power switch is reduced to a voltage equal to or approximately equal to zero before a turn-on gate drive signal is applied to the gate of the power switch.

According to the operating principles of a Class D power amplifier, the control timing of the upper switch S1 and the lower switch S2 should be symmetrical. However, it may be desirable to monitor the voltage across one switch (e.g., the voltage across the lower switch S2) of the Class D power amplifier. To ensure a reliable and robust operation, the control timing of S1 and S2 may be adjusted to be slightly asymmetrical so that it is easy for S1 to achieve soft-switching. As such, it's not necessary to monitor the voltage of S1. For example, the conduction period of S1 in a switching cycle can be made slightly longer than that of S2. As a result, S1 will achieve a zero voltage turn-on when S2 still experiences hard switching during a same operation mode. In other words, when S2 achieves zero voltage switching, S1 achieves zero voltage switching too because the system configuration above ensures that it is easy for S1 to achieve zero voltage switching in comparison with S2.

It should be noted that monitoring the voltage across S2 to achieve zero voltage switching for both S1 and S2 is merely an example. One skilled in the art will recognize that in alternative embodiments, achieving zero voltage switching for S1 and S2 can be accomplished by monitoring the voltage across S1.

In accordance with the second principle of achieving soft switching, the efficiency improvement may be achieved by monitoring Isw shown in FIG. 10. In some embodiments, the peak value or rms value of Isw can be used as an indicator for achieving soft switching. Alternatively, the value of Isw at the instants of turning on/off S1 and/or S2 can also be used as a current measurement signal for the purpose of achieving better soft switching.

In some embodiments, the efficiency may be improved by turning on S1 and S2 when Isw is equal to or approximately equal to zero. To minimize the effect of switching noise on monitoring the soft-switching condition of S2, it may be better to measure the instantaneous value of Isw either at an instant right before the turn-off of S1 or at an instant right after the turn-on of S2. Furthermore, a suitable offset may be added into the measured current signal so that a better insight into the current at the switch turn-on instant and/or the switch turn-off instant may be obtained.

Depending on different designs and applications, it may be hard to get accurate and clean current measurements at high frequencies due to the noisy environment in or around a power amplifier. As an alternative, soft switching through monitoring Isw can be replaced by assessing the voltage across S1 or S2 during the switching process. Assuming the voltage across S2 (Vsw) is used for this purpose and the turn-on process of S2 is used as an example, there may be three scenarios to be considered. These three scenarios will be described in detail below.

Figure 12:
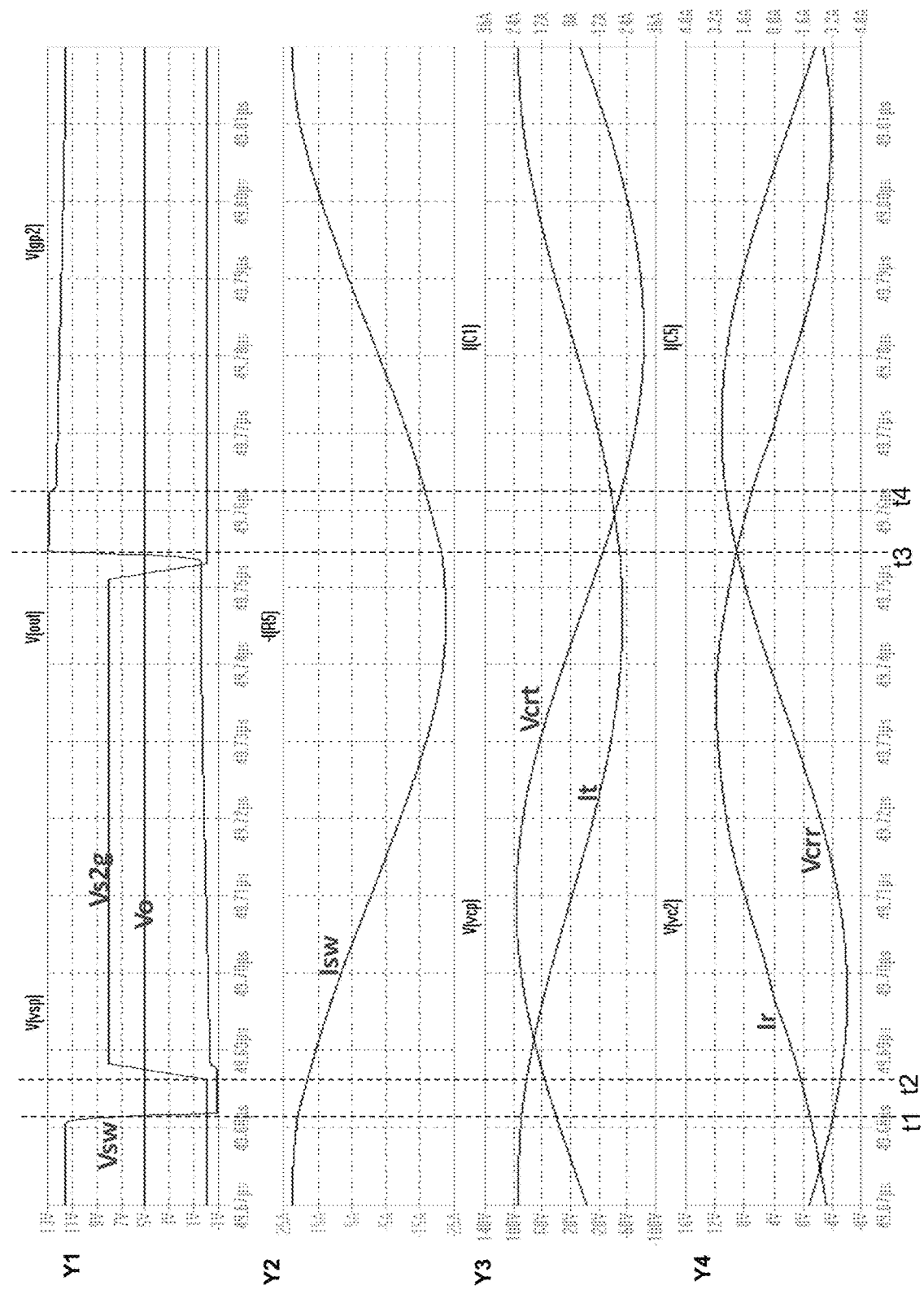
FIG. 12 shows a variety of waveforms associated with a wireless power transfer system with weak coupling between the transmitter and the receiver coils in accordance with various embodiments of the present disclosure.

In a first scenario, referring back to FIG. 7, Vsw is reduced to a voltage approximately equal to zero before S2 is turned on. As shown in FIG. 7, the derivative of Vsw is high right before S2 is turned on or in the time period during which the body diode of S2 starts to conduct. It should be noted that the actual value of Vsw should be negative. The absolute value of Vsw is approximately equal to zero. Such a high derivative value of Vsw indicates that Isw is too high at the turn-on of S2 or at the turn-off of S1. In other words, the inductive reactive power is relatively high in the system. It should be noted that Isw should be positive during this process to achieve soft switching for S2. FIG. 12 shows Isw is relatively high and the period of body diode conduction (body diode of S2) is relatively long. Crt or Crr may be adjusted to reduce the inductive reactive power at the output port of the power amplifier. For example, the capacitance of Crt may be reduced in order to reduce the inductive reactive power at the output port of the power amplifier.

Figure 13:
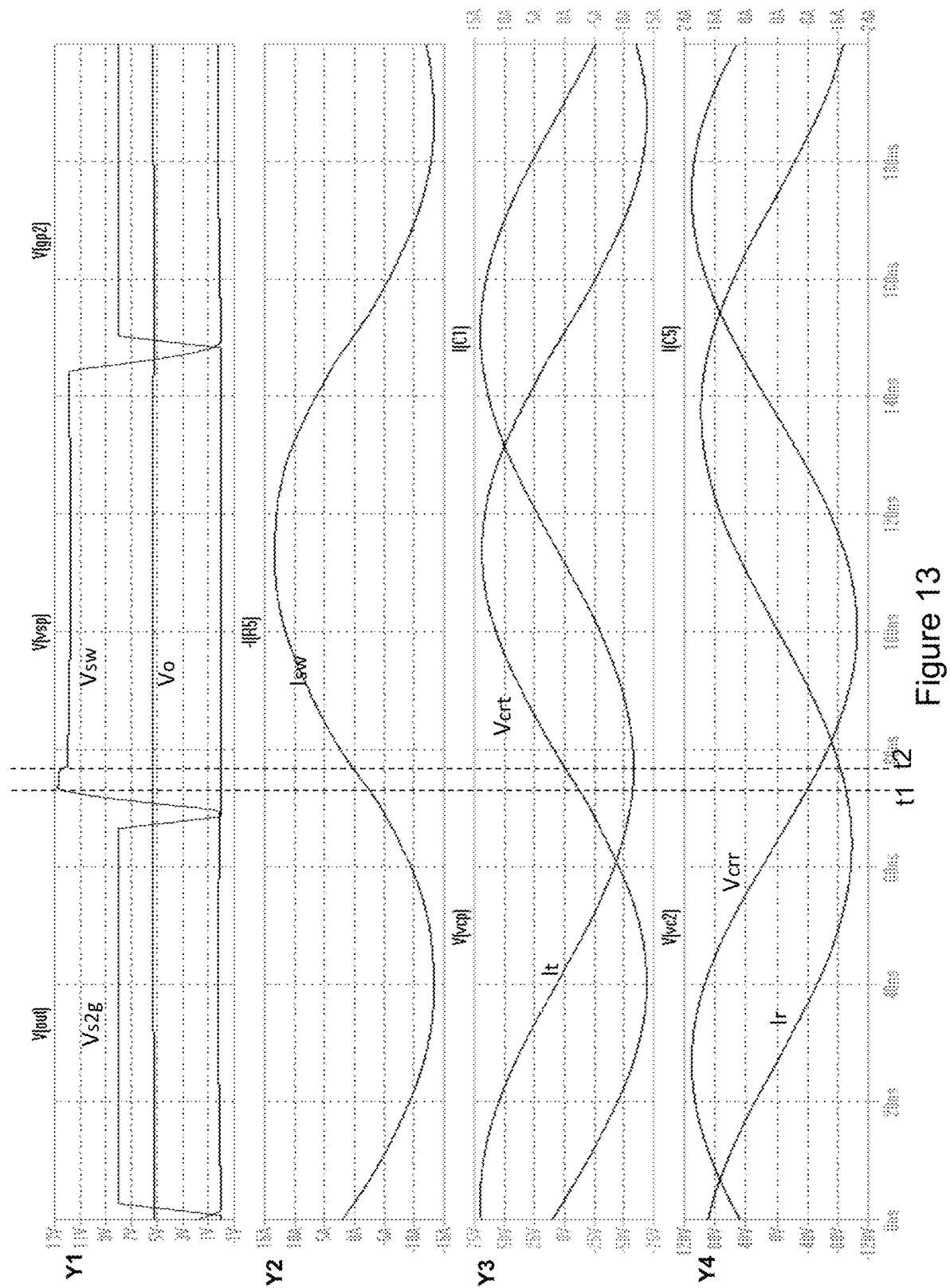
FIG. 13 shows a variety of waveforms associated with a wireless power transfer system with the same coupling as that of FIG. 12 in accordance with various embodiments of the present disclosure.
Figure 14:
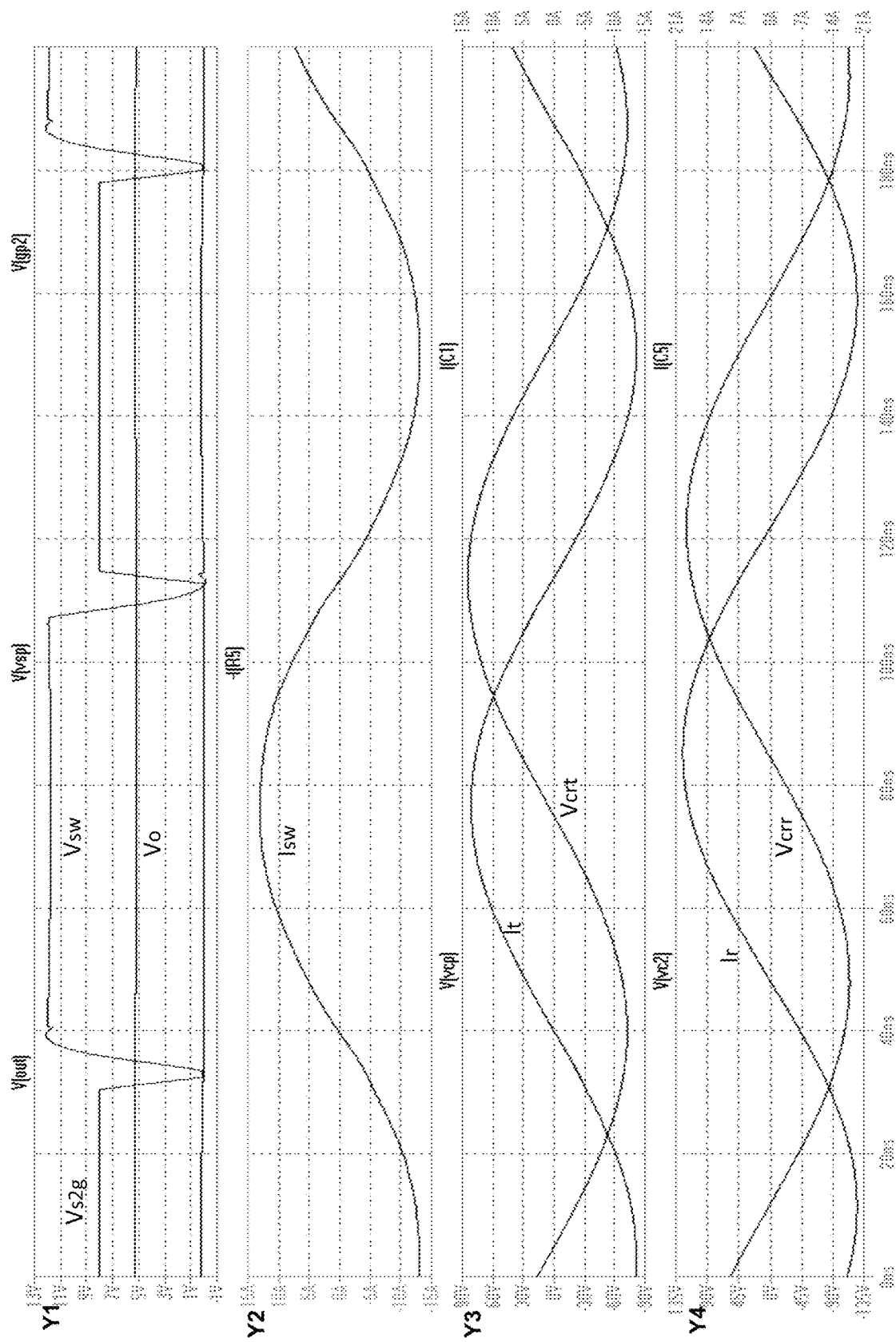
FIG. 14 shows a variety of waveforms associated with a wireless power transfer system with stronger coupling between the transmitter and the receiver coils in accordance with various embodiments of the present disclosure.

In a second scenario, Vsw is reduced to a voltage approximately equal to zero before S1 is turned on, and the derivative of Vsw is low or approximately equal to zero right before S2 is turned on or the body diode of S2 starts to conduct. Such a low derivative of Vsw indicates that the current Isw is at a right value for achieving soft switching. It is not necessary to further adjust Crt and/or Crr. The waveforms associated with the second scenario are illustrated in FIGS. 13-14.

In a third scenario, Vsw is at a significant value when S1 is turned on, and soft-switching is not achieved. This indicates that current Isw is too small at the switching instants (could even be negative), and the reactive power at the output port of the power amplifier is either too small, or is capacitive. Crt or Crr should be adjusted to increase the inductive reactive power at the output port of the power amplifier. For example, the capacitance of Crt should be increased so as to increase the inductive reactive power at the output port of the power amplifier.

It should be noted that the dead-time between S1's conduction and S2's conduction may also be adjusted to achieve better soft-switching results. This can be performed in synch with the capacitance modulation technique described above if necessary.

As described above, the derivative of the voltage signal Vsw can be used to indicate whether soft-switching has been achieved or adjustments based upon the capacitance modulation technique are needed. The derivative of the voltage signal Vsw can be obtained through a software means and/or a hardware means. The software means can be implemented as a digital differentiator and the like. The hardware means can be implemented as a RC network, a combination of a RC network and an operational amplifier, and the like. The software means and hardware means described above are well known in the industry, and hence are not discussed in detail herein to avoid repetition.

In some embodiments, if the value of a voltage across a switch (e.g., Vsw) and its derivative are both at a value equal to or approximately equal to zero at the instant when the switch is turned on, a better soft-switching condition has been achieved. As such, the better soft-switching condition can be determined by adding a soft-switching observer (not shown but illustrated in FIG. 11) to monitor the voltage across the switch (e.g., Vsw) and/or the current flowing through the switch (e.g., Isw). Based upon the capacitance modulation schemes above (three scenarios), the values of Crt and/or Crr may be adjusted accordingly.

The output of the soft-switching observer may determine whether the system should increase or decrease the capacitances of Crt and/or Crr. Furthermore, the adjustment step depends on the output of the soft-switching observer. For example, the step of the adjustment can depend on the value of Isw or the derivative of Vsw at the previous turn-on instant of S2. A filter may be included to filter out possible noise depending on the values of Isw and/or the derivatives of Vsw at the last several turn-on instants of S2.

The output of the soft-switching observer may be constructed in the following manner. First, the output of the soft-switching observer generates zero when the power amplifier has already achieved soft switching and no further adjustment is necessary. Second, the output of the soft-switching observer generates a positive value when the power amplifier has already achieved soft switching, but the inductive reactive power of the wireless power transfer system is too high (the switch current is too high when the switch is turned on). The value of the positive value generated by the soft-switching observer indicates the adjustment speed and/or the adjustment step. Third, the output of the soft-switching observer generates a negative value when the power amplifier has not achieved soft switching yet and the inductive reactive power of the wireless power transfer system is too low and needs to be increased. The absolute value of the negative value indicates the adjustment speed and/or the adjustment step.

In some embodiments, Isw can be sampled in synch with the switching of the power switches of the power amplifier. The sampled signal may be further analyzed based upon the operating conditions when the sampling occurs. For example, the sampled signal of Isw may be analyzed in consideration with whether the switches are turned on with soft-switching when the sampling occurs. Furthermore, filtering functions may be employed in the sampling process or the analyzing process, to further reduce noise and get an appropriate output.

It should be noted the output of the soft-switching observer may be constructed in a variety of ways. For example, an offset may be added to the output of the soft-switching observer so that the system avoids dealing with a negative value at the output of the soft-switching observer. It should further be noted that the adjustment of Crt and/or Crr above can be accomplished either in a digital fashion or in an analog fashion.

The capacitance modulation technique described above can be applied to other power amplifier topologies such as push-pull power amplifiers, class-E power amplifiers and the like. By directly assessing and regulating the soft-switching condition of a power switch in the power amplifier through current information at a switch's turn-on instant or turn-off instant, a better soft-switching condition can be achieved against operating condition variations such as input voltage variations, output load variations, temperature variations, switch parasitic capacitance variations and switching parameter variations, and circuit parameter variations including inductance and capacitance variations as well as coupling variations.

The impact of the EMI filters (e.g., transmitter EMI filter and receiver EMI filter) and other auxiliary circuits (e.g., impedance matching circuit) on the switches' soft-switching may also be considered when the soft-switching observer generates its output indicating the capacitance modulation step and speed. In sum, through the capacitance modulation technique described above, the system not only achieves soft-switching of the power switches (and thus lower power losses, higher device reliability, and lower noise), but also ensure the reactive power and current stresses are at the minimum while delivering the required output power. One advantageous feature of having the capacitance modulation technique described above is that high performance and low cost can be achieved in a design at the same time.

In the system shown in FIG. 10, there may be a feedback control system having two control variables, namely the capacitance of Crt and the capacitance of Crr. Two outputs of the control system may be controlled through adjusting these two control variables. In some embodiment, one output of the control system is the output voltage or the output power of the receiver. The other output of the control system is the soft-switching condition of the power switches.

In some embodiments, feedback control mechanisms can be used to determine the values of the control variables. According to the feedback control mechanisms, the control system outputs can be used as inputs of a feedback controller. The modulation of Crr changes both the real part and the imaginary part of the impedance of the receiver power circuit reflected in the transmitter, and thus affects both active power and reactive power in the wireless power transfer system. The modulation of Crt only changes the imaginary part of the impedance in the transmitter power circuit. In addition, the modulation of Crt changes the magnitude of the current flowing through the transmitter coil, thereby affecting both reactive power and active power in the wireless power transfer system. The changes of the capacitance of Crt and/or the capacitance of Crr will cause both active power changes, which contribute to the changes of Vo or Po, and reactive power changes, which contribute to the change of the soft-switching condition. Therefore, two outputs in this feedback control system exist. In some embodiments, a two-input and two-output controller may be employed to fulfill the feedback functions described above. Such a two-input and two-output controller may be built with information transferred across the Bluetooth communication channel. In alternative embodiments, a fast speed control mechanism may be implemented by using a plurality of local controller in the transmitter and/or in the receiver (receivers).

Figure 11:
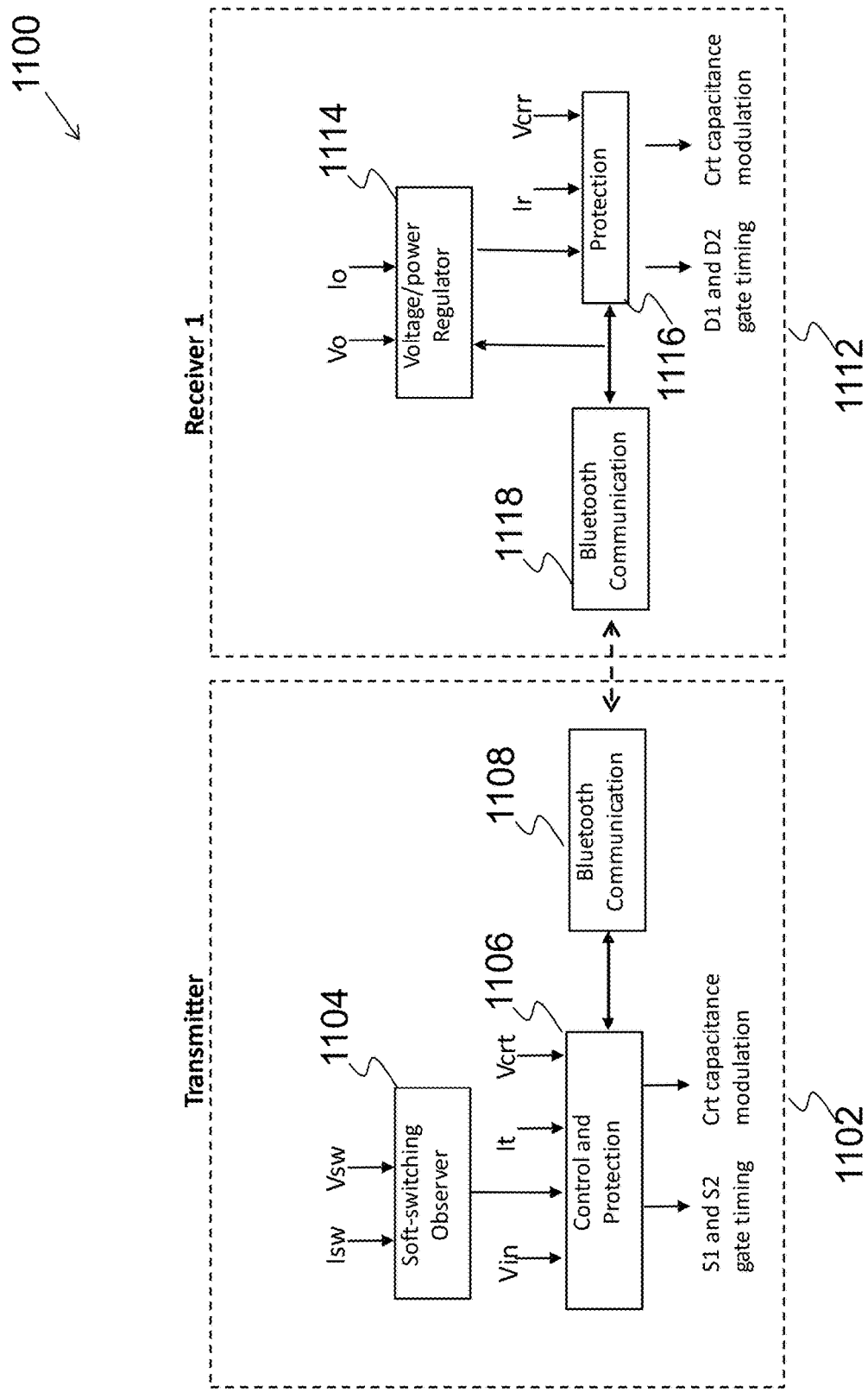
FIG. 11 illustrates a block diagram of an implementation of a feedback control system of a wireless power transfer system in accordance with various embodiments of the present disclosure.

FIG. 11 illustrates a block diagram of an implementation of a feedback control system of a wireless power transfer system in accordance with various embodiments of the present disclosure. The wireless power transfer system 1100 comprises a power transmitter 1102 and a power receiver 1112 coupled together through magnetic coupling. It should be noted while FIG. 11 shows one power receiver is coupled to the power transmitter 1102, multiple power receivers may be alternatively included in the wireless power transfer system 1100.

The power transmitter 1102 comprises a soft switching observer 1104, a control and protection unit 1106 and a transmitter Bluetooth communication unit 1108. As shown in FIG. 11, the soft switching observer 1104 may receive two input signals, namely Isw and Vsw and generates an output coupled to a second input of the control and protection unit 1106. The soft switching observer 1104 may also use the gate timing information of S1 and S2, which is generated internally in the transmitter control system. The control and protection unit 1106 have a first input receiving Vin, a third input receiving the current It flowing through the transmitter coil and a fourth input receiving a voltage Vcrt across Crt. The control and protection unit 1106 has an input/output connected to the transmitter Bluetooth communication unit 1108. The control and protection unit 1106 has a first output for controlling the gate timing of S1 and S2, and a second output for modulating the capacitance of Crt.

The power receiver 1112 comprises a voltage/power regulator 1114, a protection unit 1116 and a receiver Bluetooth communication unit 1118. As shown in FIG. 11, the voltage/power regulator 1114 may receive two input signals, namely Vo and Io. The voltage/power regulator 1114 may also receive a signal from the receiver Bluetooth communication unit 1118 and/or the protection unit 1116. The voltage/power regulator 1114 generates an output signal fed into a first input of the protection unit 1116. The protection unit 1116 has a second input receiving the current Ir flowing through the receiver coil and a third input receiving a voltage Vcrr across Crr. The protection unit 1116 has an input/output connected to the receiver Bluetooth communication unit 1118. The protection unit 1116 may have a first output for controlling the gate timing of D1 and D2 when the rectifier is implemented as a synchronous rectifier, and a second output for modulating the capacitance of Crr. It should be noted that the gate timing of D1 and D2 is applicable to D1 and D1 only when the rectifier formed by D1 and D2 is replaced by synchronous rectifier. The receiver Bluetooth communication unit 1118 may communicate to the transmitter Bluetooth communication unit 1108 as shown in FIG. 11.

As shown in FIG. 11, the soft switching observer 1104 receives the detected signals Isw and/or Vsw. The soft switching observer 1104 decides whether an adjustment is needed to achieve a soft switching condition based on the information received at the inputs (e.g., Vsw and/or Isw). The control and protection unit 1106 may comprise a controller. The controller receives the output signal from the soft switching observer 1104 as well as the input voltage Vin, the current flowing through the transmitter coil Lt and the voltage across Crt. Based upon the received signals, the controller in the control and protection unit 1106 may adjust the capacitance of Crt and/or the timing of S1 and S2 at the same time when necessary. The adjustments of the capacitance of Crt and/or the timing of S1 and S2 help to archive the better soft switching of S1 and S2.

The controller in the control and protection unit 1106 may comprise a feedback compensator such as a proportional-integral-derivative (PID) compensator. The PID compensator is configured such that the output of the soft switching observer 1104 generates a value equal to zero or a fixed value representing a soft switching condition.

The controller in the control and protection unit 1106 may be implemented as a digital controller. The digital controller may be implemented in hardware, software, any combinations thereof and the like. For example, the controller may be implemented as an adder with some filtering functions, a lookup table with some filter functions to translate the output of the soft-switching observer 1104 into a capacitance value (or states of the controllable switches in a variable capacitance network). The controller may also take into account Vin and adjust the capacitance value of Crt accordingly in a feedforward manner.

In some embodiments, Crt can also be used to protect the power transmitter 1102 from a variety of abnormal operating conditions such as over-voltage, over-current, over-temperature and any other faulty conditions. For example, the system may keep monitoring the current flowing through the transmitter coil and/or the voltage across the resonant capacitor Crt. When an over current or an over voltage occurs, the system may be protected by changing the capacitance value of Crt. Depending on design needs and different applications, the value of Crt can be adjusted to a small or a big value so that the power and current will be reduced quickly.

The transmitter Bluetooth communication unit 1108 can pass information between the power transmitter 1102 and the power receiver 1112. Furthermore, the communication between the power transmitter 1102 and the power receiver 1112 helps to adjust the control parameters and functions slowly in the power transmitter 1102 and the power receiver 1112.

In the power receiver 1112, a voltage/power regulator 1114 regulates the output voltage or power to a desired value based on the detected signals Vo and/or Io. This regulation can be performed by a feedback compensator, such as a PID compensator, inside the voltage/power regulator 1114. Furthermore, a feedforward control mechanism for controlling Io and/or Vo may be also used at the same time.

It should be noted that the control mechanism described above is merely an example. There may be many alternatives, modifications and variations for implementing the control schemes for the voltage/power regulator 1114. For example, this regulation can be done by a search mechanism to search an appropriate value for the capacitance of Crr. Such an appropriate value helps the power receiver 1112 achieve better results.

It should further be noted that there may be more than one capacitance of Crr obtained during the search mechanism. In other words, multiple values of Crr may give similar results (e.g., output power or output voltage) in a complex system. Among these values of Crr, the appropriate one is the capacitance having a resonant frequency close to the system frequency. Such a resonant frequency is alternatively referred to as the receiver resonant point throughout the description.

In some embodiments, the search mechanism may be implemented by starting from a value at or close to the receiver resonant point in any search action of Crr and performing new searches regularly to avoid entering deeply into a wrong search direction. Similarly, the initial output of the feedback compensator in the voltage/power regulator 1114 can be set to a value corresponding to a suitable Crr value. The suitable Crr value may result in a resonant frequency close to the receiver resonant point. Furthermore, the regulator can be reset to the initial value regularly.

In some embodiments, Io can be sensed from the rectifier, at the output port of the power receiver and/or from the load. In some embodiments, there may be a communication channel between the load and the power receiver. The control mechanism of the power receiver may be coordinated with any changes in the load through the communication channel between the load and the power receiver.

The output of the voltage/power regulator 1114 is used to modulate the capacitance value of Crr. In some embodiments, the modulation of the capacitance of Crr can also be used to protect the receiver from a variety of abnormal operating conditions such as over-voltage, over-current, over-temperature and other abnormalities. For example, the current flowing through the receiver coil, the voltage across the resonant capacitor Crr, the output voltage Vo and/or the output current Io may be monitored by the power receiver 1112. When a fault (e.g., over current or an over voltage) occurs, the system may be protected by changing the capacitance value of Crr. Depending on design needs and different applications, the capacitance value of Crr can be adjusted to a small or a big value so that the power and current will be reduced quickly.

The receiver Bluetooth communication unit 1118 can pass information between the power transmitter 1102 and the power receiver 1112. Furthermore, the communication between the power transmitter 1102 and the power receiver 1112 helps to adjust the control parameters and functions slowly in the power transmitter 1102 and the power receiver 1112.

To avoid severe interaction between the transmitter control and the receiver control, the local feedback control loops in the transmitter and in the receiver should have different control speeds. For example, the transmitter can modulate Crt with a first control bandwidth. The receiver can modulate Crr with a second control bandwidth. In order to avoid interference between these two control loops, the control system should be designed such that the first control bandwidth is higher than the second control bandwidth.

The coordination of the Crt capacitance modulation and the Crr capacitance modulation can be achieved without passing significant information through the slow Bluetooth communication channel. However, if necessary, adjustment and calibration information can pass through the Bluetooth communication channel to further improve the performance of the local control loops.

FIG. 12 shows a variety of waveforms associated with a wireless power transfer system with weak coupling between the transmitter and the receiver coils in accordance with various embodiments of the present disclosure. In some embodiments, the coupling coefficient is about 10%.

The horizontal axis of FIG. 12 represents intervals of time. The unit of the horizontal axis is microsecond. There may be four vertical axes. The first vertical axis Y1 represents the voltage ($V_{SW}$) across the drain-to-source of the switch S2, the gate drive voltage ($V_{s2g}$) of the switch S2 and the output voltage Vo. The second vertical axis Y2 represents the current ($I_{SW}$) flowing through the first inductor L1. The third vertical axis Y3 represents the current ($I_t$) flowing through the transmitter coil Lt and the voltage ($V_{crt}$) across the capacitor Crt. The fourth vertical axis Y4 represents the current ($I_r$) flowing through the receiver coil Lr and the voltage ($V_{crr}$) across the capacitor Crr.

As shown in FIG. 12, the output voltage Vo is maintained around 5 V in order to be compatible with the USB specification. From t1 to t2, Vsw is approximately equal to −1V. The negative voltage of Vsw indicates the conduction of the body diode of S2. From t3 to t4, the Vsw is about one diode voltage drop above the voltage rail (e.g., Vsw in steady state). The one diode voltage drop indicates the conduction of the body diode of S1. Since both body diodes conduct before turning on their respective switches, both S1 and S2 achieve soft switching. However, the conduction time of the body diodes is too long. As a result, the efficiency of the wireless power transfer system may be not as good as what it is expected to be under a soft switching operation condition.

FIG. 13 shows a variety of waveforms associated with a wireless power transfer system with the same coupling as that of FIG. 12 in accordance with various embodiments of the present disclosure. In some embodiments, the output power of the wireless power transfer system is about 33 W. The coupling coefficient is about 10%. In comparison with the system shown in FIG. 12, the capacitance values of Crt and Crr are adjusted to achieve both output voltage regulation (Vo is slightly greater than 5 V) and better soft switching of S1 and S2.

As shown in FIG. 13, the waveform of Vsw indicates that both S1 and S2 are turned on with soft switching. The turn-on time of S1 is not equal to the turn-on time of S2. Under this asymmetric operation of S1 and S2, it is easier for S1 to enter into soft switching in comparison with S2. The waveform of Vsw from t1 to t2 indicates the body diode of S1 conducts for a little while before S1 is turned on. In comparison with the body diode conduction of S1 in FIG. 11, the conduction time shown in FIG. 13 is shorter. As a result, a better soft switching condition has been achieved. It should be noted that during the turn-on transitions of S1 and S2, the current Isw is much lower than its peak value as shown in FIG. 13. Such a low current helps to reduce the switching losses of S1 and S2.

FIG. 14 shows a variety of waveforms associated with a wireless power transfer system with stronger coupling between the transmitter and the receiver coils in accordance with various embodiments of the present disclosure. In some embodiments, the output power of the wireless power transfer system is about 33 W. The coupling coefficient is about 25%.

In comparison with the system shown in FIG. 12, the capacitance values of Crt and Crr are adjusted to achieve both output voltage regulation (Vo is slightly greater than 5 V) and better soft switching of S1 and S2. As shown in FIG. 14, the waveform of Vsw indicates that both S1 and S2 are turned on with soft switching. The turn-on time of S1 is approximately equal to the turn-on time of S2. In other words, the power amplifier is under a symmetric operation. The waveform of Vsw indicates both the body diode of S1 and the body diode of S2 barely conduct. As a result, a better soft switching condition has been achieved. It should be noted that during the turn-on transitions of S1 and S2, the current Isw is approximately equal to zero as shown in FIG. 14. Such a low switching current helps to reduce the switching losses of S1 and S2.

One advantageous feature of having the capacitance modulation technique is both better soft switching and tight output regulation may be achieved by adjusting the capacitances of Crt and Crr. More particularly, the adjustment of Crr is used to regulate the output voltage or power. The adjustment of Crt is used to maintain a better soft switching condition as shown in FIGS. 13-14. In sum, the capacitance modulation technique helps to improve the system efficiency and reduce the system cost.

In some embodiments, the modulation of Crt and/or Crr may be applicable to a soft-start process of a wireless power transfer system. For example, the initial value of Crr can be set to a value that resulting in very low or zero output power. The initial value of Crr is usually away from the value that generates the receiver resonant point when Crr resonates with Lr.

The capacitance value of Crr gradually changes towards the capacitance value generating the receiver resonant point. At the same time, the output power of the rectifier also gradually increases. The gradual increase of the output power fulfills the soft-start process of the wireless power transfer system. In some embodiments, Crr can stop at an appropriate value. The selection of this appropriate value is in coordination with the output power and/or voltage regulation.

The gradual change of Crr can also be used to identify the actual resonant point of the receiver. For example, when the receiver operates at the receiver resonant point, the output power reaches its highest level for a given transmitter current (e.g., the ratio of Po to the rms value of It is maximized). This ratio can also be used to find the actual mutual inductance between the transmitter coil and the receiver coil because there is a well-defined relationship between the mutual inductance and the reflected resistance.

In some embodiments, the mutual inductance information may be used to improve the system performance. The receiver resonant point information can be used to limit the range of capacitance modulation. It is desirable to modulate Crr only in one side of the receiver resonant point in normal operation. For example, it is desirable to only allow Crr to be modulated to a value less than the capacitance generating the receiver resonant point. The mutual inductance between the receiver and the transmitter in a wireless power transfer system may change when the relative position of the transmitter coil and the receiver coil changes. Furthermore, other factors such as metal or magnetic objects placed nearby may change their relative position between the receiver and the transmitter. In order to solve the issue caused by the change of the relative position, the receiver resonant point and the mutual inductance can be retested regularly or when any related relative position change occurs around the receiver.

The mutual inductance is sensitive to foreign objects, so the test of the mutual inductance can be a good way to identify the presence of a foreign object close to the receiver or the transmitter. Similarly, the method of testing the mutual inductance described above can be used to test the transmitter resonant point. With the resonant capacitance of every receiver coupled to the transmitter reduced to a level approximately equal to zero, the receiver coils may not generate considerable currents to interact with the transmitter's magnetic field. However, the change of the transmitter coil's inductance caused by magnetic parts and/or metal parts placed around the receivers still exists. By sweeping the value of Crt slowly and measuring the transmitter current or an impedance associated with the resonant tank of the transmitter, the transmitter resonant point, at which Crt and Lt resonate at the system frequency, can be identified.

During some phases of operation of a wireless power transfer system, a transmitter needs to identify the presence of a valid receiver without transferring significant power to the receiver. During this kind of systems, Crr can be set very low or even zero, so the power delivered to the receiver's output is very low, but the voltage across Lr can be high enough so that a different power path (also coupled to Lr) can deliver enough energy to wake up the receiver's controller and enable a communication between the receiver and the transmitter.

Figure 15:
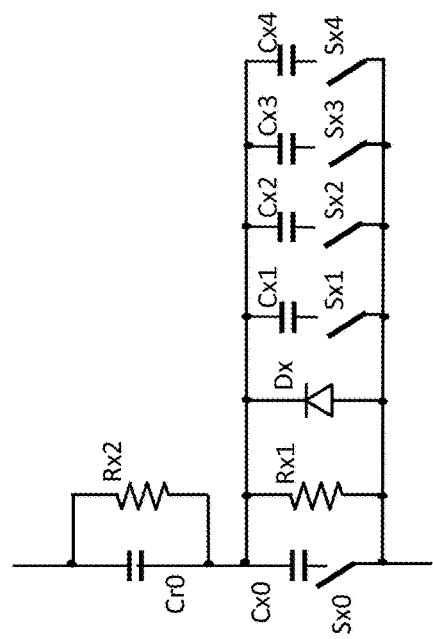
FIG. 15 illustrates a schematic diagram of a variable capacitance network in accordance with various embodiments of the present disclosure.

FIG. 15 illustrates a schematic diagram of a variable capacitance network in accordance with various embodiments of the present disclosure. The variable capacitance network 1500 is used to adjust the capacitance of Crr. In other words, Crr shown in FIG. 10 may be replaced by the variable capacitance network 1500 shown in FIG. 15. It should be noted that, in order to achieve capacitance modulation, Crt shown in FIG. 10 may be replaced by a variable capacitance network similar to that shown in FIG. 15.

The variable capacitance network 1500 comprises a diode Dx, a divider formed by Rx1 and Rx2, a first capacitor Cr0 connected in parallel with Rx2 and a plurality of capacitor-switch networks. As shown in FIG. 15, there may be five capacitor-switch networks. A first capacitor-switch network comprises a capacitor Cx0 and a switch Sx0 connected in series and further connected in parallel with Rx1 as shown in FIG. 15. Likewise, a second capacitor-switch network comprises a capacitor Cx1 and a switch Sx1 connected in series and further connected in parallel with Rx1; a third capacitor-switch network comprises a capacitor Cx2 and a switch Sx2 connected in series and further connected in parallel with Rx1; a fourth capacitor-switch network comprises a capacitor Cx3 and a switch Sx3 connected in series and further connected in parallel with Rx1; a fifth capacitor-switch network comprises a capacitor Cx4 and a switch Sx4 connected in series and further connected in parallel with Rx1.

It should be recognized that while FIG. 15 illustrates the variable capacitance network 1500 with five capacitor-switch networks, the variable capacitance network 1500 could accommodate any number of capacitor-switch networks. It should further be noted that the first capacitor-switch network may be replaced by a capacitor depending on different design needs and applications.

The diode Dx functions as a clamp diode. In some embodiments, the diode Dx may be replaced by a unidirectional switch having an anti-parallel body diode such as a MOSFET. The switches Sx0, Sx1, Sx2, Sx3 and Sx4 are used to control the total capacitance of the variable capacitance network 1500. By controlling the on/off states of the switches Sx0, Sx1, Sx2, Sx3 and Sx4, a variety of capacitances may be obtained accordingly. For example, when all switches Sxo through Sx4 are open, the equivalent capacitance of the variable capacitance network 1500 is approximately equal to zero. On the other hand, when all switches Sxo through Sx4 are closed, the equivalent capacitance of the variable capacitance network 1500 reaches its maximum capacitance value.

In some embodiments, the diode Dx may be implemented as a switch. When this switch is closed, the equivalent capacitance of this variable capacitance network may be approximately equal to the capacitance of Cr0.

Rx1 and Rx2 are used to ensure the current flowing through Dx is small during normal operation. The value of the current flowing through Dx may be adjusted by selecting the values of Rx1 and Rx2. In some embodiments, Rx1 and Rx2 may be two separate components. In alternative embodiments, Rx1 and Rx2 may be from the parallel parasitic resistance of the corresponding capacitors (e.g., Cr0 and Cx0) and switches (e.g. Sx0).

As described above, the capacitance of the variable capacitance network 1500 may be reduced to a level approximately equal to zero by keeping all switches open. Such a feature may help wireless power transfer systems (e.g., the wireless power transfer system shown in FIG. 10) achieve flexible protection and/or standby control mechanisms. More particularly, in wireless power transfer systems (e.g., the wireless power transfer system shown in FIG. 10), by reducing the capacitance of the variable capacitance network 1500, the output power of the receiver may drop accordingly no matter how much current is flowing through the transmitter coil.

In a standby mode of a receiver (e.g., the receiver shown in FIG. 10), the capacitance of Crr is set to a minimum value (approximately equal to zero) by controlling the variable capacitance network 1500. Since the capacitance of Crr is very small, the currents in the receiver coil, the receiver resonant circuit and the rectifier are reduced dramatically. As a result, almost no power is delivered from the receiver to the load coupled to the receiver. If only one receiver is magnetically coupled to the transmitter and the one receiver is set to operate in the standby mode described above, the current flowing through the transmitter is very small because the one receiver operates in the standby mode. Under this standby mode, the reactive power in the transmitter is able to maintain a better soft switching condition for S1 and S2.

In some embodiments, the efficiency of a wireless power transfer system may be further improved by applying an active mode and a standby mode in an alternating manner to the wireless power transfer system at a frequency much lower than the system frequency. This is similar to a burse-mode operation in a conventional PWM power supply. During the active mode and the standby mode, both the receiver resonant capacitance and the transmitter resonant capacitance are set to suitable values (e.g., capacitance values having a resonant frequency close to the resonant point). As such, some power is transferred from the transmitter to the receiver. During a standby mode, the capacitance of the receiver resonant capacitor or the transmitter resonant capacitor is adjusted to a value far away from their respective resonant points. As a result, there is little power transferred between the transmitter and the receiver. Furthermore, the output power and/or voltage may be regulated by controlling the duty cycle during the active mode. It should be noted that some other suitable efficiency improvement methods such as measurement, calibration, detection and the like may be performed during the standby mode operation. As a result, the system performance can be further improved.

The standby mode control mechanism described above may be applicable to a system having multiple receivers. In some embodiments, multiple receivers are magnetically coupled to a transmitter and the sum of the total power demand from all receivers exceeds the power capability of the transmitter, the standby mode operation described above can be used to regulate and limit the power delivered to each receiver or some receivers. As a result, the transmitter can work within its safe operating region while delivering power to receivers in an acceptable manner.

Alternatively, the transmitter may instruct some or all receivers to modify their power demands through the Bluetooth communication system shown in FIG. 10. In response to the instruction from the transmitter, the related receivers can reduce their power demands by modulating their resonant capacitances Crr. Furthermore, because the modulation of the capacitance of Crr in a receiver changes the reflected impedance of the receiver in the transmitter, the power distribution among the receivers can be adjusted by modulating the capacitance of Crr in the receivers.

In sum, the output power and/or voltage of each receiver can be controlled separately in a smooth manner by employing the capacitance modulation technique in the receivers. The ability of reducing the power in any receiver to a level approximately equal to zero without affecting the operation of other receivers gives flexibility to achieve better system operation and protection control mechanisms. In particular, the modulation of the capacitance of Crr in a receiver may be used to achieve a better soft-start process and/or a better soft-stop process of the receiver as discussed earlier. As such, the addition or removal of a receiver magnetically coupled to the transmitter may have minimum operational impacts on other receivers magnetically coupled to the transmitter by employing the capacitance modulation technique.

In many applications, the input voltage Vin of a power amplifier (e.g., power amplifier shown in FIG. 10) may not have a fixed voltage. For example, if Vin is from an output of an ac/dc power supply or a dc/dc power supply, Vin may be advantageously changed by coordinating the operation of the ac/dc power supply or the dc/dc power supply with the wireless power transfer system (e.g., wireless power transfer system shown in FIG. 10).

In some embodiments, the ac/dc power supply or the dc/dc power supply may be part of the wireless power transfer system to facilitate the coordination process described above. In particular, during the coordination process, Vin can be used to control the output power and/or the output voltage of a receiver of the wireless power transfer system. As such, there may be one more control variable. This additional control variable can be used to further improve the performance of the wireless power transfer system. For example, after having the additional control variable, the modulation of the capacitance of Crr in a receiver can be used to fine-tune the resonant frequency of the receiver resonant tank to a frequency approximately equal to the system frequency. As a result, the current in the transmitter coil can be reduced.

In some embodiments, multiple receivers may be magnetically coupled to the transmitter. The fine-tune process of the resonant frequency of a receiver described above can be applied to the one with a maximum power demand or the one requiring the highest transmitter current.

Furthermore, after having the additional control variable Vin, in a wireless power transfer system having a single receiver, the capacitance value of Crr can be fixed to a suitable value (e.g., a value having a resonant frequency around the receiver resonant point) to maintain good performance. Such a fixed capacitance of Crr helps to simplify the receiver design, thereby reducing the cost of the wireless power transfer system. It should be noted that after having the additional control variable, it is still necessary to modulate the capacitance of Crt in the transmitter to maintain a better soft-switching condition for power switches S1 and S2. The presence of the additional control variable Vin may help to reduce the variation range of the capacitance of Crt.

In some embodiments, the additional control variable Vin can also be used to limit the current in the transmitter coil Lt. Because the current flowing through the transmitter coil Lt plays an important role in determining the coil temperature, the power losses, the system EMI performance, the magnetic field strength around the transmitter coil and the like, it is desirable to limit the transmitter coil current to a lower value. In some embodiments, when the wireless power transfer system demands more power, the additional control variable Vin can be used to increase the total power available for a given set of circuit parameters. On the other hand, when the wireless power transfer system's power demand drops, Vin can be reduced accordingly to achieve better system efficiency. In this way, the additional control variable Vin helps to maintain a better operating condition over a wide range of output power and a variety of coupling conditions. Furthermore, when a wireless power transfer system needs to be shut down for protection purposes, Vin can be reduced to a very low value or zero to shut down the wireless power transfer system in a smooth manner.

In some embodiments, the output voltage Vo may be used as one additional control variable for further improving the performance of a wireless power transfer system. For example, if the output voltage Vo is not used directly to power a sensitive load (e.g., power is delivered to a battery through a battery charger or power is delivered to a load through one or more power converters), Vo can be adjusted within a certain range to achieve a better system operation condition. More particularly, the control variable Vo may be used to better compensate the coupling coefficient variations. When the coupling between a receiver and a transmitter is strong, the output voltage Vo is set to a higher value in response to the strong coupling between the transmitter and the receiver. On the other hand, when the coupling between the receiver and the transmitter is weak, the output voltage Vo is set to a lower value in response to the weak coupling between the transmitter and the receiver. The control mechanism based upon the Vo adjustment helps to reduce the maximum current in the transmitter coil as well as the capacitance ranges of Crt and Crr.

In some embodiments, a variable output voltage Vo in a certain range may be acceptable. In order to limit the stresses on the power components, Vo may vary in response to output power changes. Furthermore, it may be desirable to set a higher Vo for a receiver when the power required from the receiver is high. As such, the currents in the receiver coil and other components as well as the current in the load are limited to a reasonable value to achieve better performance, thereby reducing the cost of the system.

In some embodiments, when the power demand from a receiver is very low, it may be desirable to operate the transmitter and/or the receiver in a burst mode operation. The burst mode can be achieved by combining an active mode with a standby mode. For example, when the required power from a receiver is below a certain threshold, the system is in a normal active power transfer mode for a certain time, and then enters into a standby mode for another period of time. The standby mode can be created through a variety of methods including reducing the input voltage fed into the power amplifier to a very low voltage level, changing the capacitance of Crt to a much lower value or much higher value, and/or changing the capacitance of Crt to a much lower value or much higher value. It should be noted that either a higher value of the resonant components or a lower value of the resonant components may help the system achieve the standby mode because the output power is low when the resonant frequency is away from the system frequency.

The burst mode described above is also applicable to a wireless power transfer system having multiple receivers magnetically coupled to a transmitter. In particular, any receiver can enter into a burst mode operation by modulating the capacitance of Crr of this receiver without interrupting the operation of other receivers. Furthermore, the transmitter can be put into the burst mode operation by modulating the capacitance of Crt if all of the receivers magnetically coupled to the transmitter are required to generate low power and operate in the burst mode. Under such a burst mode operation, the output power of each receiver relative to other receivers can still be regulated by selecting a right value for the resonant capacitor in the receiver or by adjusting the duty cycle of the active power transfer mode of the receiver.

In a wireless power transfer system, the voltages and currents in the transmitter and the receiver are all affected by the changes of the resonant capacitances in the transmitter and in the receiver. The capacitance modulation in the transmitter and the receiver can be used to provide an in-band communication channel between the transmitter and the receiver. In order to achieve this in-band communication channel, an appropriate communication protocol needs to be established to facilitate the in-band communication in a wireless power transfer system. The current, voltage and/or power in the transmitter and the receiver of the wireless power transfer system can be used as the means to convey information for the in-band communication.

It should be noted that if the operating frequency of a wireless power transfer system is allowed to change, the operating frequency of a wireless power transfer system can be used as a control variable. The operating frequency variations can be used to control and protect the wireless power transfer system in a way similar to the control mechanism based upon the Vin variations described above.

The control mechanisms described above may be applicable to a soft start process in a wireless power transfer system. For example, during a soft start process, the wireless power transfer system may operate in a hybrid mode comprising both an active mode and a standby mode. In particular, the active mode and the standby mode are applied to the wireless power transfer system in an alternating manner. In addition, the duty cycle of the active mode increases gradually during the soft start process. In this way, the average output power is controlled by the duty cycle of the active mode operation.

During the soft start process, the capacitance modulation technique can be used to control the output power of the wireless power transfer system during the active mode operation. For example, by modulating the capacitance, the output power in the active mode is set to a lower level during an early stage of the soft start process, and the output power increases gradually as the soft start process progresses towards the completion. In this way, the start-up process can be made even softer than the process having only the capacitance modulation or the duty cycle control. It should be noted that other control variables such as gradually increasing the input voltage, gradually changing the switching frequency and the like can also be used to achieve a smooth soft start process. The other control variables can be taken either individually or in combination with the capacitance modulation and/or the duty cycle control. Furthermore, it should be noted that all control methods for a soft-start process described above can be applicable to a soft-stop process if required.

To reduce the system cost, different parts of a wireless power transfer system can be integrated into a plurality of ICs. The level of integration should be determined in consideration with the power level and/or the system design requirements. For some application, the control system of a transmitter and/or the control system of a receiver can be integrated into one IC, which may also include the capacitance modulation circuit and some of the variable capacitance networks shown in FIG. 15. For some applications, the power amplifier, the receiver rectifier, the EMI filter, and the capacitance modulation circuit, and some of the variable capacitance networks can be integrated into their respective ICs separately.

In some embodiments, depending upon different applications and design needs, a plurality of ICs comprising the power amplifier, the receiver rectifier, the EMI filter, the capacitance modulation circuit and some of the variable capacitance networks can be integrated into one IC through suitable semiconductor fabrication processes such as vertically stacking a plurality of ICs on top of each other and the like.

In some embodiments, depending upon different applications and design needs, the whole transmitter except the transmitter coil may be integrated into one IC, and the whole receiver except the receiver coil may be integrated into another IC.

In some embodiments, depending different applications and design needs, the whole transmitter including the transmitter coil can be integrated into one IC. The whole receiver including the receiver coil can be integrated into another IC.

In sum, modulating reactive components in a transmitter (e.g., the capacitance of Crt) and in a receiver (e.g., the capacitance of Crr) of a wireless power transfer system has been described above. The capacitance modulation technique helps to improve the performance of the wireless power transfer system through modulating the resonance processes in the transmitter and the receiver.

In some wireless power transfer systems, one or more additional intermediate resonators, which may be a coil coupled to a resonant capacitor, are placed between the transmitter coil and the receiver coil. The resonance modulation technique described above can also be applied to the one or more intermediate resonators to achieve better results in a manner similar to that used for modulating the resonant component in a transmitter (e.g., modulating the capacitance of Crt) or in a receiver (e.g., modulating the capacitance of Crr).

Modulating a capacitance or inductance to regulate the power processing can be used in other configurations. For example, if the transmitter is implemented as a current source, the capacitance of the resonant capacitor of a receiver coupled to the transmitter can be modulated to regulate the receiver's output.

In a power supply having multiple outputs, the capacitance modulation technique described above can be used to regulate some outputs too. For example, the power supply may have a structure similar to that shown in FIG. 10 except that a plurality of receivers are strongly coupled to the transmitter. In other words, the transmitter may be a primary side of the power supply and the plurality of receivers may form the secondary side of the power supply. In operation, the capacitance in the primary side and/or the switching frequency can be used to maintain a better soft-switching condition for the primary switches or to regulate one of the multiple outputs. The capacitance modulation in the secondary side can be used to regulate the other outputs.

In some embodiments, an input of a power converter is connected to an ac power supply (e.g., a 110 V ac voltage). The power converter converts the 110 V ac voltage from a wall socket into a dc voltage suitable to the power amplifier of a wireless power transfer system. The power converter may be implemented as an ac/dc power adapter comprising an ac/dc rectifier and a dc/dc converter. Alternatively, the power converter may be implemented as a dc/dc converter if the source power is a dc power supply. The techniques discussed above can be used to design the dc/dc converter. For some low power applications, the topologies described below with respect to FIG. 16 may be alternatively used.

Figure 16:
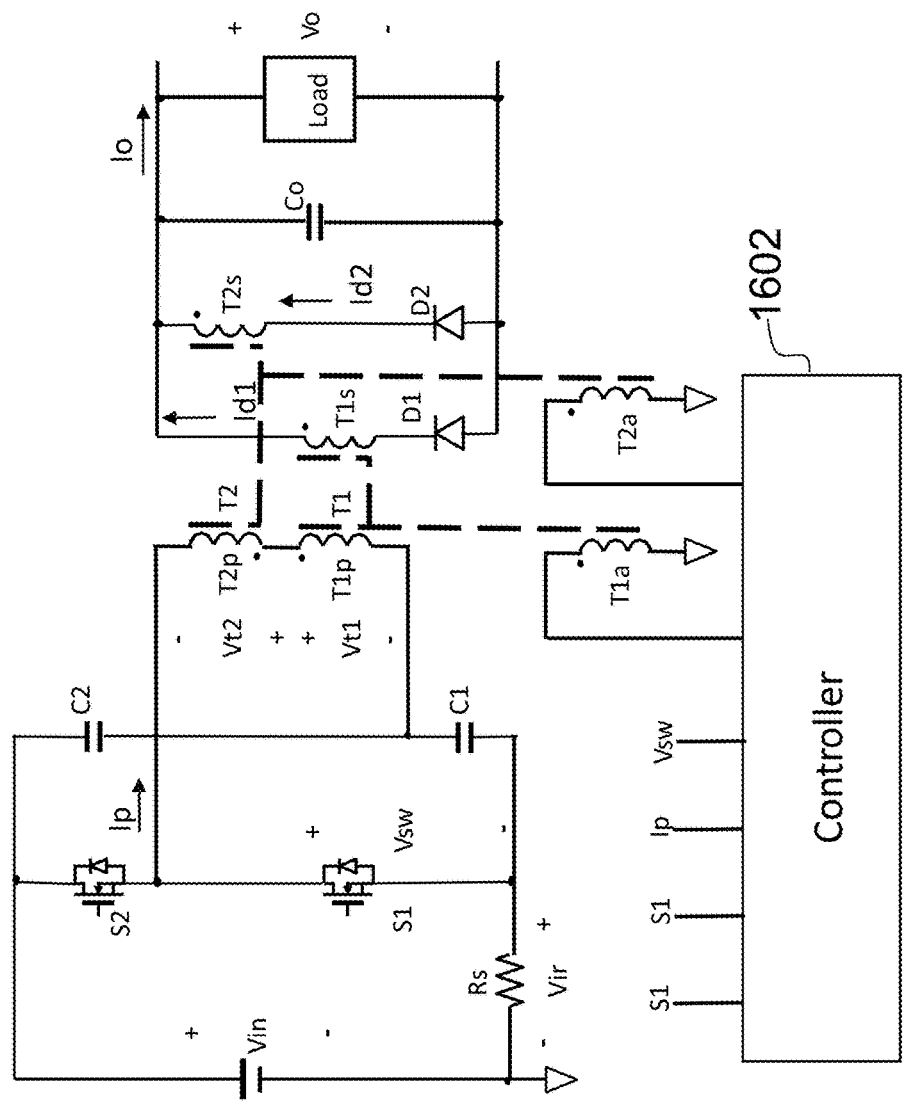
FIG. 16 illustrates a schematic diagram of a zero-voltage switching asymmetric half-bridge converter in accordance with various embodiments of the present disclosure.

FIG. 16 illustrates a schematic diagram of a zero-voltage switching asymmetric half-bridge converter in accordance with various embodiments of the present disclosure. The zero-voltage switching asymmetric half-bridge converter 1600 comprises a primary side circuit comprising S1, S2, C1 and C2, a secondary side circuit comprising D1, D2 and Co, a first transformer T1 coupled between the primary side and the secondary side and a second transformer T2 coupled between the primary side and the secondary side. The zero-voltage switching asymmetric half-bridge converter 1600 further comprises a controller 1602 having a first input/output terminal generating a gate drive signal for S1, a second input/output terminal generating a gate drive signal for S2, a third input/output terminal receiving a detected current signal Ip flowing through the primary side of the transformer winding of T1, a fourth input/output terminal receiving a detected voltage signal Vsw across the drain-to-source of S1, a fifth input/output terminal coupled to a winding of the first transformer T1 and a sixth input/output terminal coupled to a winding of the second transformer T2.

In some embodiments, S1 and S2 are controlled by two complementary gate drive signals. For example, S1 has a conduction duty cycle of D, and S2 has a duty cycle of 1-D. It should be noted that there may be a short dead-time between S1's conduction period and S2's conduction period in each switching cycle.

The first transformer T1 comprises a primary winding T1p, a secondary winding T1s and an auxiliary winding T1a. The second transformer T2 comprises a primary winding T2p, a secondary winding T2s, and an auxiliary winding T2a. As shown in FIG. 16, T2p and T1p are connected in series between the common node of S1 and S2, and the common node of C1 and C2. T1s is connected in series with D1; T2s is connected in series with D2. T1a is coupled to the fifth input/output of the controller 1602 and T2a is coupled to the sixth input/output of the controller 1602.

D1 and D2 form a rectifier coupled between T1s and T2s, and the output. D1 and D2 can be implemented as a synchronous rectifier. C1, C2, S1 and S2 form a half-bridge configuration. Co is an output capacitor to further attenuate the ripple of the output voltage Vo.

When S1 conducts, a positive voltage is applied to T2p, and D2 conducts because it is forward-biased. The power is delivered to the output through T2s. During this time, a negative voltage is applied to T1p. As a result, D1 is reverse-biased. The reverse-biased D1 prevents T1s from delivering power to the output. The first transformer T1 acts like an inductor. In particular, the primary winding of the first transformer T1 has been charged and energy is stored in the first transformer T1. After a conduction period of DTs (Ts is the duration of a switching cycle and D is the duty cycle of S1), S1 is turned off. A negative current Ip charges the capacitance across S1 and discharges the capacitance across S2. As a result, Vsw moves towards the positive rail. The voltage across S2 is approximately equal to zero because Vsw is approximately equal to the positive rail. As such, S2 can be turned on with zero voltage switching after a short transition time.

When S2 is turned on, a positive voltage is applied to T1p. In response to the positive voltage applied to T1p, D1 starts to conduct and energy is delivered from T1 to the output. During this time, D2 is reverse-biased. The reverse-biased D2 prevents T2s from delivering power to the output. The second transformer T2 acts like an inductor. In particular, the primary winding of the second transformer T2 has been charged and energy is stored in the first transformer T2. The stored energy will be delivered to the output in the next switching cycle.

After a conduction period of slightly less than (1-D)Ts, S2 is turned off. Ip, which is positive now, discharges the capacitance across S1. After the capacitor across S1 has been discharged, Vsw moves towards the negative rail. After a short transition time, S1 can be turned on with zero voltage switching. In this way, both S1 and S2 can be turned on with zero voltage switching, which helps to achieve a high efficiency and low EMI operation of the zero-voltage switching asymmetric half-bridge converter 1600.

The turns ratio and magnetizing inductance of T1 and T2 can be designed such that zero voltage switching can be maintained for S1 and S2 over a wide range of operating conditions. A soft-switching observer as discussed before can be used to identify whether an acceptable soft-switching condition has been achieved. If not, the switching frequency can be adjusted for improving the soft switching condition. For example, the waveform of Vsw and/or the waveform Isw can indicate whether a power switch has achieved zero voltage switching (zero-voltage turn-on). If a power switch does have soft switching, the switching frequency of S1 and S2 can be reduced. If both S1 and S2 have achieved soft-switching, and at the turn-on instants of S1 and S2, Isw is too high or the derivative of Vsw is too high in magnitude, the switching frequency of S1 and S2 should be changed. By adjusting the switching frequency in a reasonable range, a good trade-off on efficiency may be achieved.

In some embodiments, the zero-voltage switching asymmetric half-bridge converter 1600 operates in a continuous conduction mode. During the continuous conduction mode, a current flows through D1 during the period from the turn-on of S2 to the turn-off of S2. On the other hand, a current flows through D2 during the period from the turn-on of S1 to the turn-off of S1. The output voltage of the zero-voltage switching asymmetric half-bridge converter 1600 can be expressed by the following equation:

$$V_O = \frac{D(1-D)Vin}{K1 + D(K2 - K1)} \quad (1)$$

where K1 is the turns ratio of the first transformer T1 (e.g., K1 is equal to the number of turns of T1p divided by the number of turns of T1s); K2 is the turns ratio of the second transformer T2 (e.g., K2 is equal to the number of turns of T2p divided by the number of turns of T2s). D is the duty cycle of S1.

In some embodiments, K1 is equal to K2 or D is very small. Equation (1) above can be simplified to the following equation:

$$V_O \approx \frac{D(1-D)Vin}{K1} \quad (2)$$

Equation (2) indicates under such conditions (e.g., K1 is equal to K2 or a small duty cycle), the zero-voltage switching asymmetric half-bridge converter 1600 behaves like a conventional single-transformer asymmetric half-bridge converter, which is well known in the art, and hence is not discussed herein.

In some embodiments, the duty cycle D is small and K1 is much greater than K2 (K1>>K2). Equation (1) above can be simplified to the following equation:

$$V_O \approx \frac{DVin}{K1} \quad (3)$$

Equation (3) indicates under such conditions (e.g., D is small and K1>>K2), the zero-voltage switching asymmetric half-bridge converter 1600 behaves like a conventional forward converter, which is well known in the art, and hence is not discussed herein.

In some embodiments, the zero-voltage switching asymmetric half-bridge converter 1600 operates in a light load mode. In response to the light load mode, D is reduced and the zero-voltage switching asymmetric half-bridge converter 1600 enters into a discontinuous conduction mode.

Under the discontinuous conduction mode, one of the transformers shown in FIG. 16 may not transfer much energy to the output. As a result, a corresponding diode coupled to its secondary winding stops conducting current because the current previously flowing through the diode falls to a level approximately equal to zero even though the corresponding primary switch is still conducting. Under this discontinuous conduction mode, the converter behaves like a flyback converter, which is well known in the art, and hence is not discussed herein.

It should be noted that, during the discontinuous conduction mode, the switching frequency of the zero-voltage switching asymmetric half-bridge converter 1600 can be lowered to further reduce the power losses.

In some embodiments, the zero-voltage switching asymmetric half-bridge converter 1600 operates in an ultra-light load mode. It should be noted that there may be a threshold between the light load mode described above and the ultra-light load mode described herein. The selection of this threshold depends on different applications and design needs.

In response to the ultra-light load mode, the power switches S1 and S2 may no longer work in the complementary mode. Instead, S2 may be turned on just for a short time. Furthermore, it may be not necessary to apply a high voltage gate drive signal to S2. For example, the turn-on time of S2 may be limited to the conduction of the body diode of S2. More particularly, S2 may be not turned on and the body diode of S2 may not conduct current. For example, the capacitance across S2 may be discharged to some degree but not completely discharged when the discharging current is very small.

Figure 18:
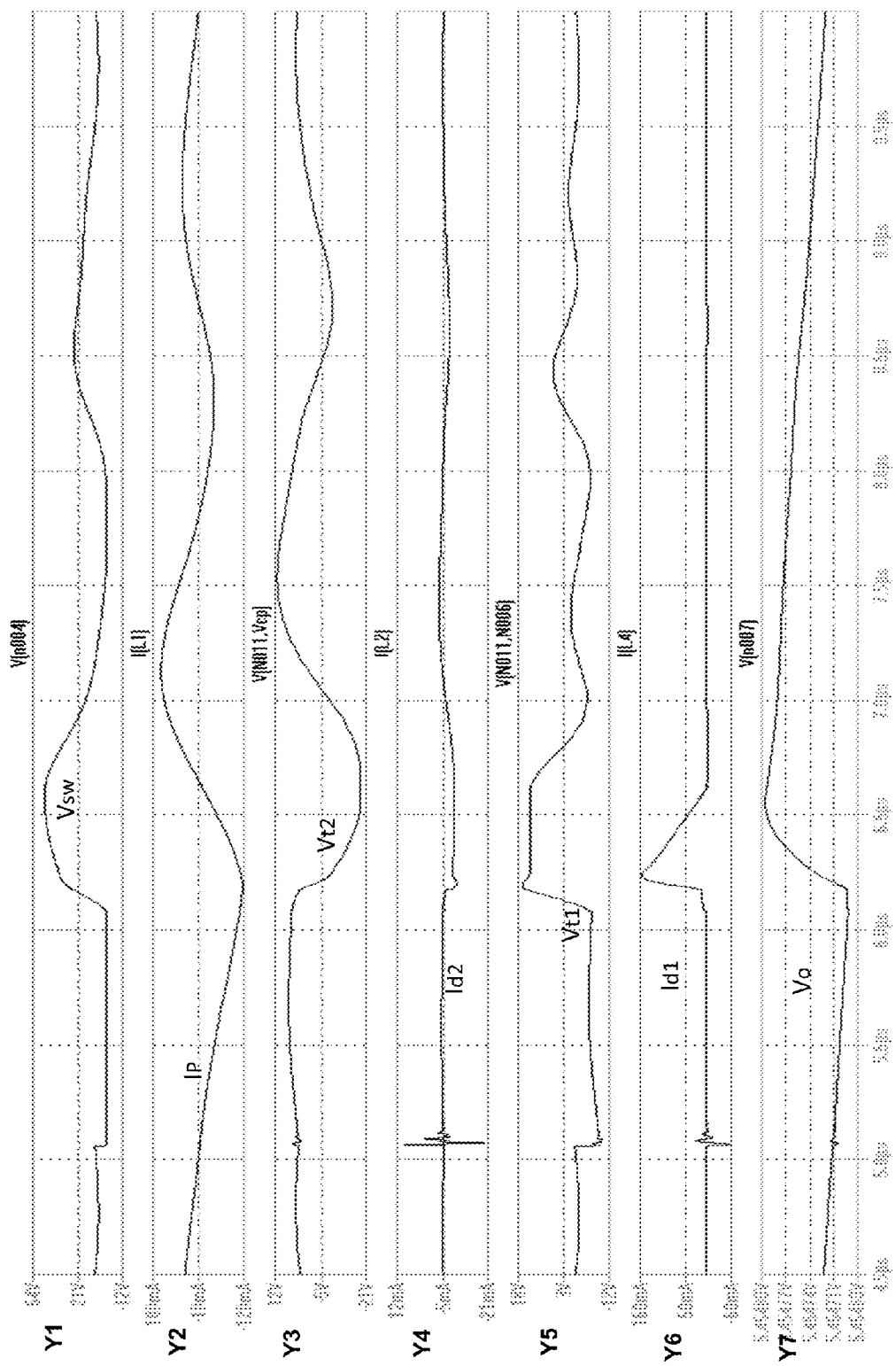
FIG. 18 illustrates a variety of waveforms associated with the zero-voltage switching asymmetric half-bridge converter operating in the ultra-light load mode in accordance with various embodiments of the present disclosure.

The operation in such a mode is explained with reference to the simulation results as shown in FIG. 18. For a short period of time, S1 is turned on and operates in a normal operation mode. During the turn-on time of S1, both the first transformer T1 and the second transformer T2 are charged, and Ip is a negative current, but increases in amplitude. However, because the voltage across the primary windings, which is the voltage across C1 is much lower than the input voltage Vin during the turn-on time of S1, neither D1 nor D2 conducts during the turn-on time of S1. After S1 is turned off, some of the energy stored in transformers T1 and T2 is delivered to the output through D1. The body diode of S2 may conduct for a short time if Ip has high enough magnitude to discharge the capacitance across S2 completely. However, in the simulation shown in FIG. 18 below, because the energy in the transformers T1 and T2 is low, D2 never conducts because a reverse voltage is applied to the diode D2.

In operation, the voltage across the auxiliary winding T1a can be sampled as a signal representing or indicating the output voltage Vo. When the current in D1 falls to zero or close to zero, D1 stops conducting current, and the magnetizing inductance of T1 and T2 resonates with the capacitances across S1 and S2. As a result, Vsw is of an oscillation waveform during this time. See FIG. 18 below. The flux balance of T1 and T2 is maintained during this mode of operation through the conduction of D2 and/or the oscillation of Vsw. The conduction time of S2, the conduction time of S1, and/or the switching frequency can be used to regulate the output voltage and/or the output power.

It should be noted that S2 doesn't need to be turned on in each switching cycle. S2 can be tuned on when more energy is needed. Furthermore, when S2 is turned on, the turn-on and/or the turn off of S2 may be in sync with the turn-on and/or the turn-off of S1. By this way, at least one of S1 and S2 is turned on with zero voltage switching or turned on with a significantly reduced voltage across the switch.

In this ultra-light load operation mode, either S1 or S2 may not achieve soft-switching. However, because the voltage applied to the switch not having soft switching is low, the switching losses as well as the conduction losses may be low too. As a result, the total power loss is kept at a very low level. If necessary, the zero-voltage switching asymmetric half-bridge converter 1600 shown in FIG. 16 may operate in a burst mode when the output power is below a suitable threshold. The burst mode helps to further reduce the power loss at very light or no load.

The controller 1602 shown in FIG. 16 can be configured in accordance with the different operating modes described above. As a result, the zero-voltage switching asymmetric half-bridge converter 1600 shown in FIG. 16 may achieve better performance.

In order to further reduce the cost of the zero-voltage switching asymmetric half-bridge converter 1600 shown in FIG. 16, a primary side controller may be employed. In particular, the output voltage and/or current regulation circuit is placed at the primary side of the transformers T1 and T2. When D1 conducts current, the output voltage can be detected on the windings of T1. Likewise, when D2 conducts current, the output voltage can be detected on the windings of T2. As such, the auxiliary winding of T1 and/or the auxiliary winding of T2 can be used to provide the information of the output voltage Vo to the control system for regulating the output voltage.

As shown in FIG. 16, auxiliary windings T1a and T2a are both coupled to the controller 1602. The voltage information from T1a and/or T2a can be sampled at each switching cycle and the sampled value is used as the feedback value of the output voltage Vo. However, in some operation modes, D1 or D2 may not conduct, or the conduction time of D1 or D2 is not long enough for achieving a reliable sampling of the information of Vo. Under this situation, the sampled voltages may not be used directly. Instead, the voltage waveforms from T1a and t2a need to be analyzed. For example, if one of the diodes doesn't conducts (which can be identified by analyzing the waveform of this diode), the corresponding sampled voltage should not be used for Vo regulation.

In some embodiments, both of these two diodes may not conduct long enough to allow a reliable sampling of the output voltage. An offset may be added to the previously sampled feedback value to form a new feedback value. In addition, the output current information can be detected at the primary side. The output current can be detected by sensing the current Isw, sensing the current flowing through the dc link current such as the voltage Vir across the current sense resistor Rs shown in FIG. 16. The sensed current information can be send into the controller 1602. The controller 1602 can provide a variety of functions such as current limiting and/or over current protection based on the sensed current information from the primary side. The ability to regulate output current from the primary side may be important for some applications such as LED lighting and the like.

Figure 17:
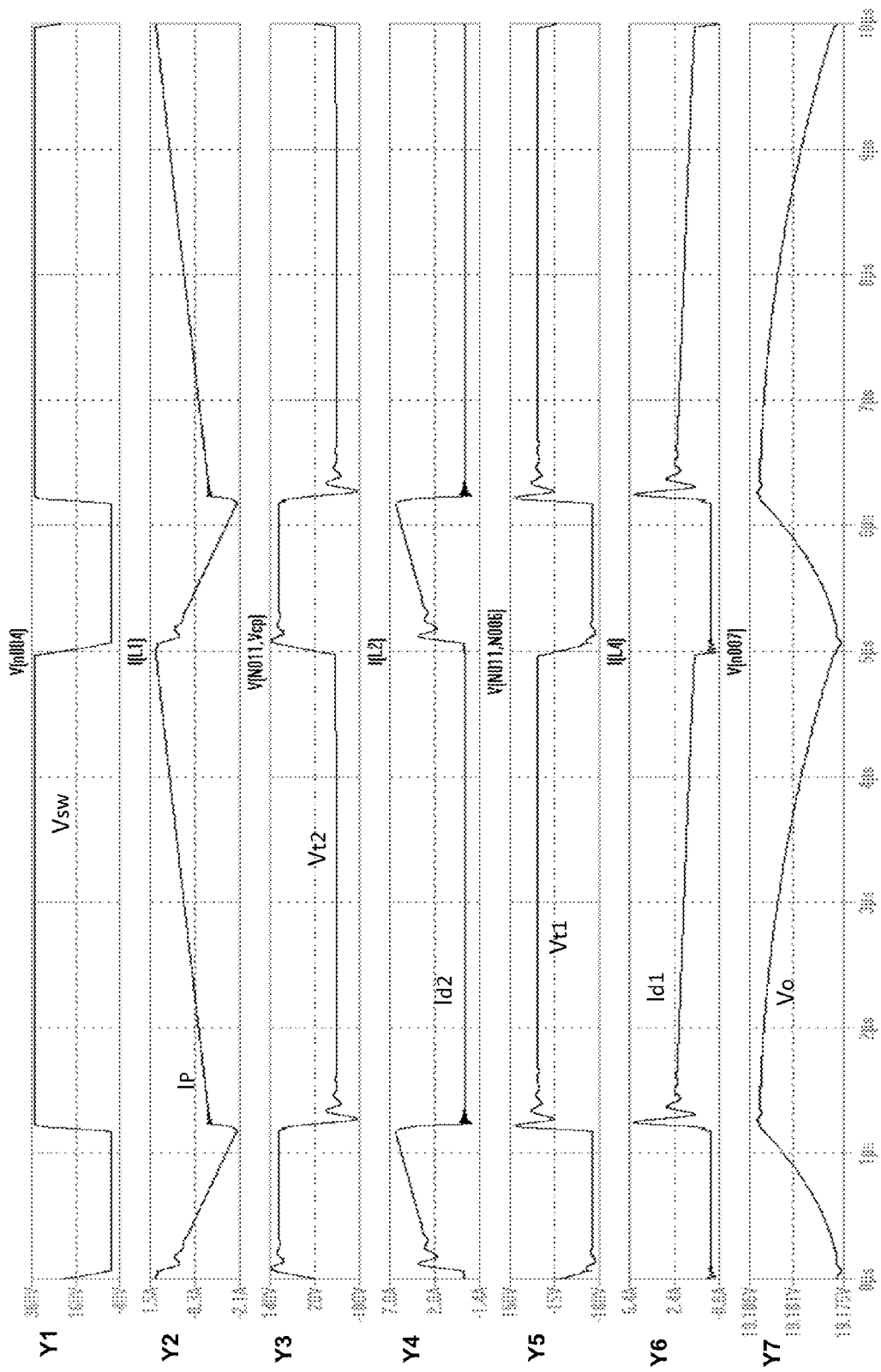
FIG. 17 illustrates a variety of waveforms associated with the zero-voltage switching asymmetric half-bridge converter shown in FIG. 16 in accordance with various embodiments of the present disclosure.

FIG. 17 illustrates a variety of waveforms associated with the zero-voltage switching asymmetric half-bridge converter shown in FIG. 16 in accordance with various embodiments of the present disclosure. The horizontal axis of FIG. 17 represents intervals of time. The unit of the horizontal axis is microsecond. There may be seven vertical axes. The first vertical axis Y1 represents the voltage ($V_{SW}$) across the drain-to-source of the switch S1. The second vertical axis Y2 represents the current (Ip) flowing through the first transformer T1. The third vertical axis Y3 represents the voltage (Vt2) across the primary winding of the second transformer T2. The fourth vertical axis Y4 represents the current (Id2) flowing through the diode D2. The fifth vertical axis Y5 represents the voltage (Vt1) across the primary winding of the first transformer T1. The sixth vertical axis Y6 represents the current (Id1) flowing through the diode D1. The seventh vertical axis Y7 represents the output voltage (Vo).

In some embodiments, the input voltage of the zero-voltage switching asymmetric half-bridge converter is about 350 V. The output voltage Vo is regulated at about 19 V. The output power is about 40 W. The operation and the corresponding waveforms of the zero-voltage switching asymmetric half-bridge converter have been described above with respect to FIG. 16, and hence are not discussed in further detail herein.

FIG. 18 illustrates a variety of waveforms associated with the zero-voltage switching asymmetric half-bridge converter operating in the ultra-light load mode in accordance with various embodiments of the present disclosure. The input voltage is about 350 V and the output voltage is about 5 V. The ultra-light load operation and the corresponding waveforms of the zero-voltage switching asymmetric half-bridge converter have been described above with respect to FIG. 16, and hence are not discussed in further detail herein.

Figure 19:
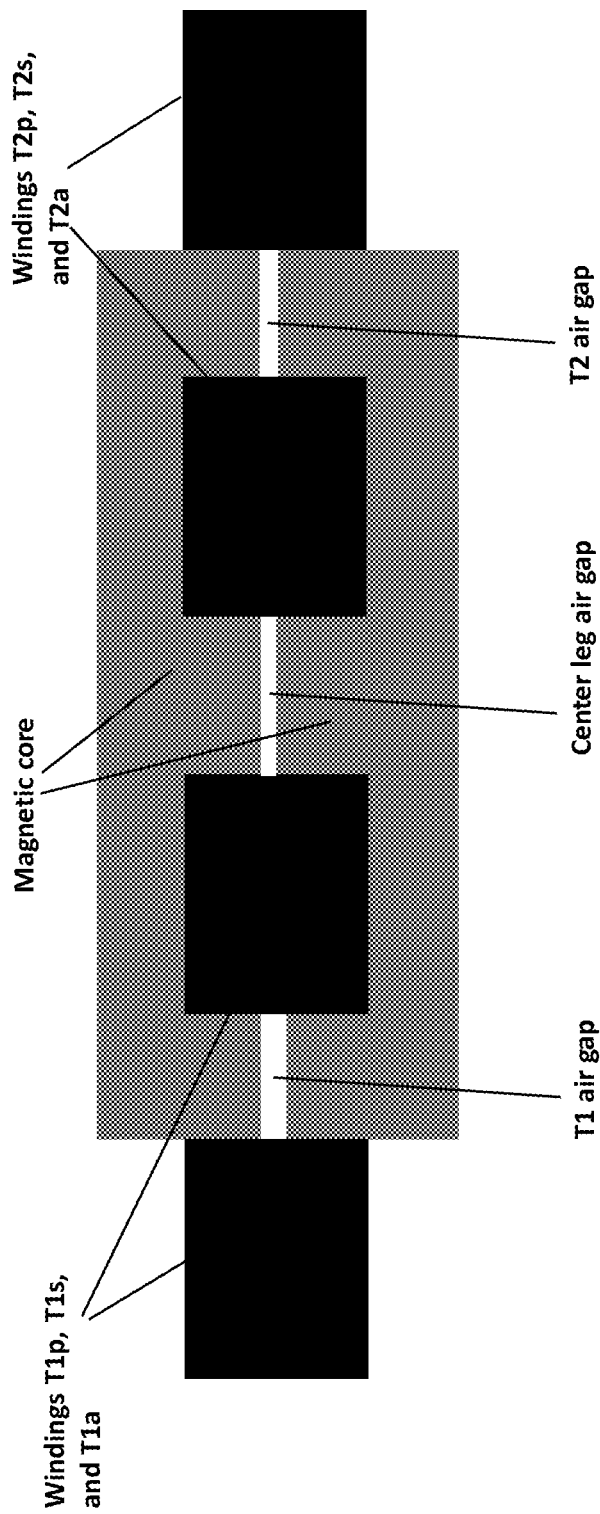
FIG. 19 illustrates a cross sectional view of an integrated magnetic structure employed in FIG. 16 in accordance with various embodiments of the present disclosure.

FIG. 19 illustrates a cross sectional view of an integrated magnetic structure employed in FIG. 16 in accordance with various embodiments of the present disclosure. The first transformer T1 and the second transformer T2 shown FIG. 16 may be implemented as two individual transformers. In alternative embodiments, these two transformers can be implemented in an integrated magnetic structure having a single magnetic core as shown in FIG. 19.

As shown in FIG. 19, T1 is implemented around one leg of the magnetic core. T2 is implemented in another leg of the magnetic core. An air gap of exists in each of these two legs so that some energy can be stored in the air gaps. Depending on different applications and design needs, the height of the air gap may be selected accordingly.

A third leg or a center leg the magnetic core provides another path for the magnetic flux in the transformers T1 and T2. An optional air gap may be added in the third leg. This optional air gap can be used to adjust the coupling between the transformers T1 and T2.

According to the topology shown in FIG. 16, the volts-second rating of T1 and T2 may be reduced to a lower level in comparison with other topologies. Such a lower volts-second rating helps to reduce the numbers of turns of T1$p$ and T2$p$. The windings of T1 and T2 can then be implemented on a PCB. Furthermore, the coupling between the windings in each transformer is tightly controlled. Such a tight controlled coupling helps to improve the control performance in PSR applications and make the EMC design simpler.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:
a power amplifier configured to receive a frequency control signal, wherein:
the frequency control signal is generated based upon a system clock of a communication device; and
the frequency control signal is used to control a switching frequency of the power amplifier; and
a first resonant circuit coupled between the power amplifier and a first coil, wherein the first resonant circuit comprises a first variable capacitance network, and wherein a capacitance of the first variable capacitance network is adjusted to improve soft switching of the system through reducing a voltage level and a current level of a switch of the power amplifier of the system at a turn-on instant of the switch.

2. The system of claim 1, further comprising:
a second coil magnetically coupled to the first coil; and
a secondary resonant circuit connected to the second coil, wherein the second resonant circuit comprises a second variable capacitance network, and wherein a capacitance of the second variable capacitance network is adjusted to regulate an output voltage of the system.

3. The system of claim 1, wherein the first variable capacitance network comprises:
a capacitor and a diode connected in series; and
a plurality of switch-capacitor networks connected in parallel with the diode, and wherein switches of the plurality of switch-capacitor networks are configured to vary a capacitance of the first variable capacitance network.

4. The system of claim 1, wherein:
the first variable capacitance network is connected in series with the first coil.

5. The system of claim 1, further comprising:
a frequency generation unit connected between the communication device and the power amplifier, wherein the frequency generation unit is configured to generate the frequency control signal based upon the system clock.

6. The system of claim 5, wherein:
a frequency of the frequency control signal is k times greater than a frequency of the system clock, wherein k is an integer.

7. The system of claim 5, wherein:
a frequency of the frequency control signal is equal to the frequency of the system clock divided by k, wherein k is an integer.

8. A method comprising:
generating a frequency control signal based upon a system clock of a communication device coupled to a wireless power transfer system comprising a first resonant circuit having a first variable capacitance network and a second resonant circuit having a second variable capacitance network;
configuring the wireless power transfer system to operate at a switching frequency substantially equal to a frequency of the frequency control signal; and
based upon a detected signal representing a current level at a turn-on transition of a power switch of the wireless power transfer system, adjusting a capacitance of the first variable capacitance network to improve soft switching of the wireless power transfer system.

9. The method of claim 8, further comprising:
adjusting a capacitance of the second variable capacitance network to regulate an output voltage of the wireless power transfer system.

10. The method of claim 8, further comprising:
applying the frequency control signal to a power amplifier of the wireless power transfer system to configure the wireless power transfer system to operate at the switching frequency substantially equal to the frequency of the frequency control signal, wherein the power amplifier is at a primary side of the wireless power transfer system.

11. The method of claim 10, wherein:
the power amplifier comprises a first switch and a second switch connected in series, and wherein a common node of the first switch and the second switch is connected to the first resonant circuit.

12. The method of claim 8, wherein:
the first variable capacitance network is connected in series with a primary coil of the wireless power transfer system; and the second variable capacitance network is connected in series with a secondary coil of the wireless power transfer system, and wherein the primary coil is magnetically coupled to the secondary coil.

13. The method of claim 8, further comprising:

adjusting the capacitance of the first variable capacitance network to achieve a soft start of the wireless power transfer system.

14. The method of claim 8, further comprising:

adjusting the capacitance of the first variable capacitance network to protect the wireless power transfer system during a fault operating condition.

15. A method comprising:

generating a frequency control signal based upon a system clock of a communication device coupled to a wireless power transfer system comprising a transmitter magnetically coupled to a receiver, wherein:

the transmitter comprises a power amplifier coupled to an input power source, a transmitter resonant tank comprising a first variable capacitance network and a transmitter coil coupled to the transmitter resonant tank; and the receiver comprises a receiver resonant tank comprising a second variable capacitance network and a receiver coil coupled to the receiver resonant tank; and configuring the wireless power transfer system to operate at a switching frequency substantially equal to a frequency of the frequency control signal.

16. The method of claim 15, further comprising:

adjusting a capacitance of the first variable capacitance network to improve soft switching of the wireless power transfer system; and adjusting a capacitance of the second variable capacitance network to regulate an output voltage of the wireless power transfer system.

17. The method of claim 15, further comprising:

generating a frequency control signal through a frequency generation unit connected between the communication device and the power amplifier.

18. The method of claim 15, further comprising:

generating a frequency control signal through a frequency generation unit, wherein frequency generation unit is part of the power amplifier.

19. The method of claim 15, the first variable capacitance network comprises:

a capacitor and a diode connected in series; and a plurality of switch-capacitor networks connected in parallel with the diode, and wherein switches of the plurality of switch-capacitor networks are configured to vary a capacitance of the first variable capacitance network.

* * * * *